(12) United States Patent
Goodrich

(10) Patent No.: US 12,023,901 B2
(45) Date of Patent: *Jul. 2, 2024

(54) EMBOSSED PAPER IN COMBINATION WITH PAPER CUSHIONING FOR SHIPPING ENVELOPES

(71) Applicant: HEXCELPACK, LLC, Sedona, AZ (US)

(72) Inventor: David Paul Goodrich, Sedona, AZ (US)

(73) Assignee: HexcelPack, LLC, Sedona, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/891,737

(22) Filed: Aug. 19, 2022

(65) Prior Publication Data

US 2023/0110789 A1    Apr. 13, 2023

Related U.S. Application Data

(60) Division of application No. 16/870,195, filed on May 8, 2020, now Pat. No. 11,440,305, which is a
(Continued)

(51) Int. Cl.
*B32B 3/24* (2006.01)
*B31D 5/00* (2017.01)
(Continued)

(52) U.S. Cl.
CPC .......... *B32B 29/005* (2013.01); *B31D 5/006* (2013.01); *B31D 5/0065* (2013.01); *B31F 1/07* (2013.01);
(Continued)

(58) Field of Classification Search
None
See application file for complete search history.

(56) References Cited

U.S. PATENT DOCUMENTS

| 683,784 A | 10/1901 | McCulloch |
| 770,293 A | 9/1904 | Kendrick |

(Continued)

FOREIGN PATENT DOCUMENTS

| CA | 80331 A | 4/1903 |
| CH | 270271 A | 8/1950 |

(Continued)

OTHER PUBLICATIONS

Machine Translation of DE4340531A1, Jun. 1994 (Year: 1994).*
(Continued)

*Primary Examiner* — Jeffrey A Vonch
(74) *Attorney, Agent, or Firm* — Studebaker Brackett, PC

(57) ABSTRACT

According to some illustrative embodiments, a protective product is provided that includes: at least one expandable slit paper sheet, said at least on expandable slit paper being expanded between opposing ends of said slit paper; a first embossed paper sheet facing said expanded slit paper sheet and a second paper sheet facing an opposite side of said at least one expanded slit paper sheet, at least one of said first embossed paper sheet and said second paper sheet being fixed to said expanded slit paper sheet at the opposing ends of said expanded slit paper sheet and thereby maintaining said expanded paper in its expanded state, said first embossed paper sheet having a plurality of embossings that increase the rigidity of said embossed paper sheet, whereby inhibiting deformation of said embossed paper sheet that is fixed to said expanded slit sheet paper.

31 Claims, 21 Drawing Sheets

Related U.S. Application Data continuation-in-part of application No. 16/531,017, filed on Aug. 3, 2019, now Pat. No. 10,981,712, and a continuation-in-part of application No. 16/018,702, filed on Jun. 26, 2018, now Pat. No. 10,669,086.

(60) Provisional application No. 62/982,662, filed on Feb. 27, 2020, provisional application No. 62/845,293, filed on May 8, 2019, provisional application No. 62/806,849, filed on Feb. 17, 2019, provisional application No. 62/798,065, filed on Jan. 29, 2019, provisional application No. 62/714,739, filed on Aug. 5, 2018, provisional application No. 62/524,905, filed on Jun. 26, 2017.

(51) Int. Cl.
| | |
|---|---|
| *B31F 1/07* | (2006.01) |
| *B32B 3/04* | (2006.01) |
| *B32B 3/12* | (2006.01) |
| *B32B 3/26* | (2006.01) |
| *B32B 3/28* | (2006.01) |
| *B32B 29/00* | (2006.01) |
| *B65D 81/03* | (2006.01) |
| *B31B 50/62* | (2017.01) |
| *B31B 70/00* | (2017.01) |
| *B31B 70/10* | (2017.01) |
| *B31B 70/14* | (2017.01) |
| *B31B 70/26* | (2017.01) |
| *B31B 70/62* | (2017.01) |
| *B31B 70/88* | (2017.01) |
| *B31B 155/00* | (2017.01) |
| *B31B 160/10* | (2017.01) |
| *B31B 170/20* | (2017.01) |
| *B31B 170/30* | (2017.01) |
| *B31D 1/00* | (2017.01) |
| *B32B 29/08* | (2006.01) |
| *B65B 5/04* | (2006.01) |
| *B65D 27/00* | (2006.01) |
| *B65D 27/16* | (2006.01) |
| *B65D 65/40* | (2006.01) |
| *B65D 81/02* | (2006.01) |

(52) U.S. Cl.
CPC .......... *B32B 3/04* (2013.01); *B32B 3/12* (2013.01); *B32B 3/266* (2013.01); *B32B 3/28* (2013.01); *B65D 81/03* (2013.01); *B31B 50/62* (2017.08); *B31B 70/00* (2017.08); *B31B 70/001* (2017.08); *B31B 70/002* (2017.08); *B31B 70/003* (2017.08); *B31B 70/008* (2017.08); *B31B 70/10* (2017.08); *B31B 70/142* (2017.08); *B31B 70/261* (2017.08); *B31B 70/62* (2017.08); *B31B 70/88* (2017.08); *B31B 2155/002* (2017.08); *B31B 2160/102* (2017.08); *B31B 2170/20* (2017.08); *B31B 2170/30* (2017.08); *B31D 1/0031* (2013.01); *B31D 5/0069* (2013.01); *B31D 2205/0023* (2013.01); *B31D 2205/0047* (2013.01); *B32B 29/08* (2013.01); *B32B 2250/03* (2013.01); *B32B 2250/04* (2013.01); *B32B 2250/26* (2013.01); *B32B 2250/40* (2013.01); *B32B 2307/50* (2013.01); *B32B 2317/12* (2013.01); *B32B 2317/122* (2013.01); *B32B 2553/02* (2013.01); *B65B 5/04* (2013.01); *B65D 27/005* (2013.01); *B65D 27/16* (2013.01); *B65D 65/406* (2013.01); *B65D 65/44* (2013.01); *B65D 2565/382* (2013.01); *B65D 2565/386* (2013.01); *Y02W 30/80* (2015.05); *Y02W 90/10* (2015.05); *Y10T 428/24149* (2015.01); *Y10T 428/24281* (2015.01); *Y10T 428/24306* (2015.01); *Y10T 428/24314* (2015.01); *Y10T 428/24331* (2015.01); *Y10T 428/24661* (2015.01); *Y10T 428/24669* (2015.01); *Y10T 428/24678* (2015.01); *Y10T 428/24702* (2015.01); *Y10T 428/24711* (2015.01); *Y10T 428/24752* (2015.01); *Y10T 428/24777* (2015.01); *Y10T 428/24793* (2015.01)

(56) References Cited

U.S. PATENT DOCUMENTS

| | | |
|---|---|---|
| 1,002,132 A | 8/1911 | Brown |
| 1,796,794 A | 3/1931 | Koppelman |
| 1,946,838 A | 2/1934 | Cofrin |
| RE19,301 E | 9/1934 | Ellis, Jr. |
| 1,995,057 A | 3/1935 | Ellis, Jr. |
| 1,999,282 A | 4/1935 | Clemens |
| 2,026,194 A | 12/1935 | Smith |
| 2,036,051 A | 3/1936 | Kieffer |
| 2,177,490 A | 10/1939 | Kieffer |
| 2,257,429 A | 9/1941 | Ruegenberg |
| 2,284,663 A | 6/1942 | Kieffer |
| 2,622,051 A | 12/1952 | Hermanson |
| 2,656,291 A | 10/1953 | Doll et al. |
| 2,856,323 A | 10/1958 | Gordon |
| 2,962,158 A | 11/1960 | Struthers |
| 2,978,006 A | 4/1961 | Clemens |
| 2,996,425 A | 8/1961 | Hamilton |
| 3,104,197 A | 9/1963 | Sangho |
| 3,218,217 A | 11/1965 | Geschwender |
| 3,220,116 A | 11/1965 | Freuler |
| 3,266,972 A | 8/1966 | Cramer |
| 3,269,393 A | 8/1966 | Ackermann |
| 3,329,562 A | 7/1967 | Schaefer |
| 3,495,761 A | 2/1970 | Hoffman |
| 3,523,865 A | 8/1970 | Ihrman |
| 3,668,055 A | 6/1972 | Gerard |
| 3,830,141 A | 8/1974 | Steidinger |
| 3,908,071 A | 9/1975 | Heim et al. |
| 3,941,308 A | 3/1976 | DiGirolomo |
| 4,011,798 A | 3/1977 | Bambara |
| 4,040,899 A | 8/1977 | Emerson |
| 4,105,724 A | 8/1978 | Talbot |
| 4,230,036 A | 10/1980 | Groome |
| 4,620,633 A | 11/1986 | Lookholder |
| 4,832,228 A | 5/1989 | Hickey |
| 5,030,189 A | 7/1991 | Hightower |
| 5,365,819 A | 11/1994 | Maida et al. |
| 5,383,778 A | 1/1995 | Schulz |
| 5,538,778 A | 7/1996 | Hurwitz et al. |
| 5,544,473 A | 8/1996 | Maida et al. |
| 5,558,923 A | 9/1996 | Vesamaa |
| 5,661,955 A | 9/1997 | Maida et al. |
| 5,667,135 A | 9/1997 | Schaefer |
| 5,667,871 A | 9/1997 | Goodrich et al. |
| 5,688,578 A | 11/1997 | Goodrich |
| 5,782,735 A | 7/1998 | Goodrich et al. |
| 6,024,832 A | 2/2000 | Trani et al. |
| 6,109,440 A | 8/2000 | Cliff |
| 6,117,062 A | 9/2000 | Alhamad |
| 6,277,459 B1 | 8/2001 | Lencoski |
| 6,458,447 B1 | 10/2002 | Cabell et al. |
| 6,712,930 B2 | 3/2004 | Koivukunnas |
| 6,871,480 B1 | 3/2005 | Goodrich |
| 6,989,075 B1 | 1/2006 | Kao et al. |
| 9,963,283 B2 | 5/2018 | Page et al. |
| 10,226,907 B2 | 3/2019 | Goodrich |
| 11,084,637 B1 | 8/2021 | Hoffman |
| 2002/0060034 A1 | 5/2002 | Hollmark et al. |
| 2004/0076798 A1 | 4/2004 | Larsson et al. |
| 2005/0136215 A1 | 6/2005 | Kuchar |
| 2007/0240841 A1 | 10/2007 | Trani et al. |
| 2008/0277303 A1 | 11/2008 | Edwards |

(56) References Cited

U.S. PATENT DOCUMENTS

| | | |
|---|---|---|
| 2010/0003431 A1 | 1/2010 | Raybuck |
| 2010/0075094 A1 | 3/2010 | Cattacin |
| 2010/0196633 A1 | 8/2010 | Kuchar |
| 2012/0008880 A1 | 1/2012 | Toth |
| 2012/0205037 A1 | 8/2012 | Kitzer |
| 2012/0219762 A1 | 8/2012 | Bazbaz |
| 2012/0248177 A1 | 10/2012 | Beaulieu et al. |
| 2012/0266568 A1 | 10/2012 | Prud'homme et al. |
| 2013/0171422 A1 | 7/2013 | De Luca et al. |
| 2014/0166661 A1 | 6/2014 | Goodrich |
| 2014/0329049 A1 | 11/2014 | Zhang |
| 2015/0122866 A1 | 5/2015 | Kuchar et al. |
| 2015/0122935 A1 | 5/2015 | Kuchar |
| 2015/0140265 A1 | 5/2015 | Page et al. |
| 2015/0151895 A1 | 6/2015 | Zhang |
| 2015/0176303 A1 | 6/2015 | Kuchar et al. |
| 2015/0321439 A1 | 11/2015 | Vogelskamp |
| 2016/0067938 A1 | 3/2016 | Goodrich |
| 2016/0355985 A1 | 12/2016 | Hashiguchi et al. |
| 2017/0107017 A1 | 4/2017 | Kuchar et al. |
| 2017/0121053 A1 | 5/2017 | Johansson |
| 2017/0203866 A1 | 7/2017 | Goodrich |
| 2017/0313017 A1 | 11/2017 | Cheich et al. |
| 2017/0341845 A1 | 11/2017 | Mulvey et al. |
| 2018/0072011 A1 | 3/2018 | Huang |
| 2018/0079161 A1 | 3/2018 | Cheich |
| 2018/0127197 A1 | 5/2018 | Goodrich |
| 2018/0222665 A1 | 8/2018 | Goodrich |
| 2018/0229910 A1 | 8/2018 | Kohn et al. |
| 2018/0265274 A1 | 9/2018 | Damarell et al. |
| 2019/0100369 A1 | 4/2019 | Hoffman et al. |
| 2020/0039720 A1 | 2/2020 | Goodrich |
| 2020/0307866 A1 | 10/2020 | Yan |
| 2020/0307867 A1 | 10/2020 | Yan |
| 2021/0101356 A1 | 4/2021 | Cheich et al. |
| 2022/0002059 A1 | 1/2022 | Asayama |

FOREIGN PATENT DOCUMENTS

| | | | |
|---|---|---|---|
| CN | 102069611 A | 5/2011 | |
| CN | 201990066 U | 9/2011 | |
| CN | 202244644 U | 5/2012 | |
| CN | 102733266 A | 10/2012 | |
| DE | 2437968 A1 | 2/1976 | |
| DE | 2824049 A1 | 12/1979 | |
| DE | 8434957 U1 | 2/1985 | |
| DE | 4340531 A1 | 6/1994 | |
| DE | 4340531 A1 * | 6/1994 | ........... B31D 3/0238 |
| DE | 4328324 A1 | 2/1995 | |
| EP | 2463088 A2 | 6/2012 | |
| EP | 2626314 A1 | 8/2013 | |
| EP | 2 815 877 A1 | 12/2014 | |
| FR | 1207005 A | 2/1960 | |
| GB | 893 060 A | 4/1962 | |
| JP | 49017672 U | 2/1974 | |
| JP | 50065388 A | 6/1975 | |
| JP | 50098194 U | 8/1975 | |
| JP | 01226574 A | 9/1989 | |
| JP | 11010755 A | 1/1991 | |
| JP | 04050647 U | 4/1992 | |
| JP | 06179471 A | 6/1994 | |
| JP | 06320647 A | 11/1994 | |
| JP | 3007594 U | 2/1995 | |
| JP | 08119334 A | 5/1996 | |
| JP | 09328170 A | 12/1997 | |
| JP | 10297676 A | 11/1998 | |
| JP | 3064623 U | 1/2000 | |
| JP | 2000043954 A | 2/2000 | |
| JP | 2002019786 A | 1/2002 | |
| JP | 2002347848 A | 12/2002 | |
| JP | 2003072848 A | 3/2003 | |
| JP | 3110361 U | 6/2005 | |
| JP | 2005-178834 A | 7/2005 | |
| JP | 2006-290356 A | 10/2006 | |
| JP | 2007238142 A | 9/2007 | |
| JP | 2010208310 A | 9/2010 | |
| JP | 2010228111 A | 10/2010 | |
| JP | 2012046217 A | 3/2012 | |
| JP | 2017-193373 A | 10/2017 | |
| JP | 2017-193376 A | 10/2017 | |
| JP | 2018177304 A | 11/2018 | |
| JP | 2019-031012 A | 2/2019 | |
| JP | 2019-031013 A | 2/2019 | |
| JP | 2019-031303 A | 2/2019 | |
| KR | 2004098544 A | 11/2004 | |
| KR | 2009047277 A | 5/2009 | |
| KR | 2011051664 A | 5/2011 | |
| KR | 2011118532 A * | 10/2011 | |
| WO | 9014998 A1 | 12/1990 | |
| WO | 9318911 A1 | 9/1993 | |
| WO | 9601731 A1 | 1/1996 | |
| WO | 9624540 A1 | 8/1996 | |
| WO | 0126889 A1 | 4/2001 | |
| WO | 0138079 A1 | 5/2001 | |
| WO | 2010101232 A1 | 9/2010 | |

OTHER PUBLICATIONS

Machine Translation of JP2010208310A, Sep. 2010 (Year: 2010).*
The extended European Search Report issued by the European Patent Office dated Jun. 6, 2023, which corresponds to Application 20802828.2 and is related to U.S. Appl. No. 17/891,737.
Notification Concerning Transmittal of International Preliminary Report on Patentability (Forms PCT/IB/326) issued in counterpart International Application No. PCT/US2020/032146 dated Nov. 18, 2021 with Forms PCT/IB/373 and PCT/ISA/237. (8 pages).
Written Opinion and International Search Report dated Dec. 27, 2019, issued in counterpart application No. PCT/US19/45027. (17 pages).
Written Opinion and International Search Report dated Aug. 6, 2020, issued in counterpart Application No. PCT/US20/32146. (15 pages).

* cited by examiner

Fig. 11
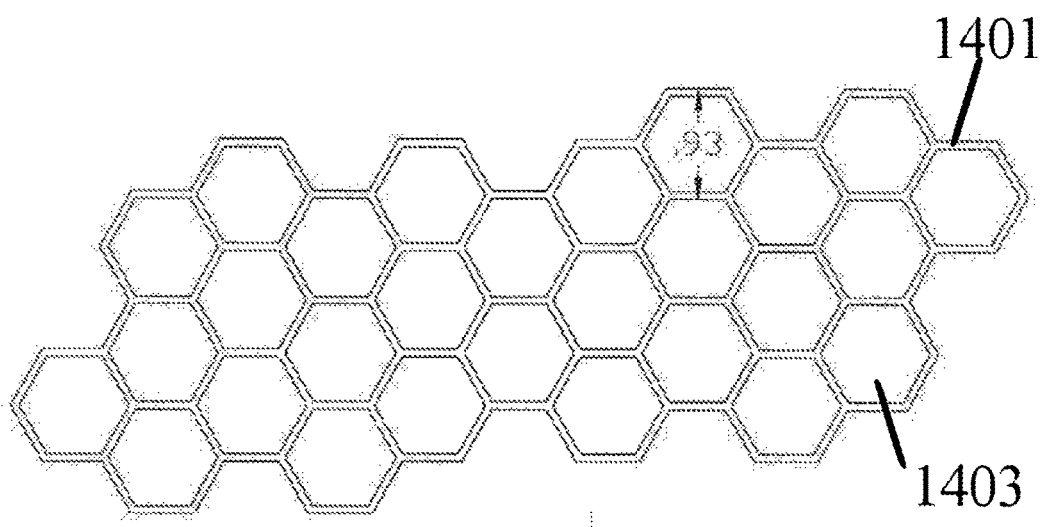
Fig. 11A
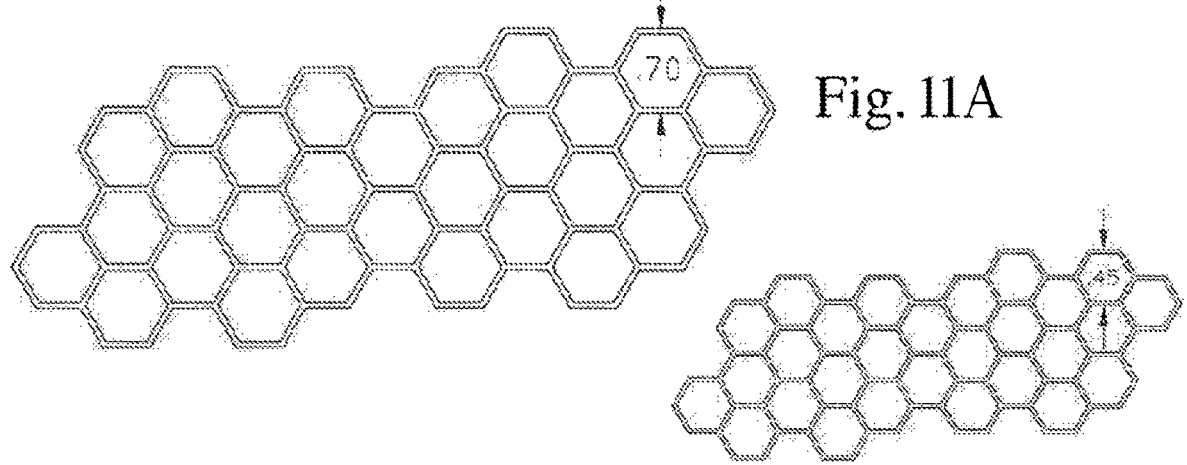
Fig. 11B

EMBOSSED PAPER IN COMBINATION WITH PAPER CUSHIONING FOR SHIPPING ENVELOPES

CROSS REFERENCE TO RELATED APPLICATIONS

This application is a divisional of U.S. application Ser. No. 16/870,195, filed May 8, 2020, which claims priority to U.S. provisional applications 62/845,293, filed May 8, 2019, entitled "EMBOSSED PAPER IN COMBINATION WITH PAPER CUSHIONING FOR SHIPPING ENVELOPES," and 62/982,662 filed Feb. 27, 2020, entitled "EXPANDED SLIT SHEET ENVELOPE CRUSH PULL SYSTEM," the entire disclosures of which provisional applications are incorporated herein by reference in full as part of the description of the present invention.

In addition, U.S. application Ser. No. 16/870,195, filed May 8, 2020, is also a continuation-in-part of U.S. non-provisional patent application Ser. No. 16/531,017, filed Aug. 3, 2019, entitled "PROTECTIVE PRODUCTS, SUCH AS ENVELOPES, HAVING A UNIQUE COMBINATION OF INTERIOR PADDING OF EXPANDED SLIT SHEET PAPER AND EXTERIOR LINING OF EMBOSSED PAPER," the entire disclosure of which is also incorporated herein by reference in full as part of the description of the present invention.

In addition, U.S. application Ser. No. 16/870,195, filed May 8, 2020, is also a continuation-in-part of U.S. non-provisional patent application Ser. No. 16/018,702, filed Jun. 26, 2018 (published Dec. 27, 2018 as U.S. 2018/0370702), entitled "EXTENSIBLE PAPER AND ITS USE IN THE PRODUCTION OF EXPANDED SLIT PACKAGING WRAP AND VOID FILL PRODUCTS," the entire disclosure of which is also incorporated herein by reference in full as part of the description of the present invention.

FIELD

The preferred embodiments of the present invention relate to the manufacture and/or use of shipping envelopes or pouches employing paper for cushioning.

DESCRIPTION OF THE BACKGROUND ART

The background art for the manufacturing of a shipping envelope has been manufactured with plastic bubble, plastic bubble-paper combination, shredded newsprint, Kraft paper, and the like. The plastic materials are quite flexible and, in some cases, provide adequate initial cushioning whereas the Kraft paper is somewhat less flexible. Background art paper alternatives have been costlier to manufacture and also more costly for the end user to ship due to their increased weight as compared to plastics.

The background art has been manufactured utilizing guillotine type start-stop non-rotary type manufacturing processes to manufacture padded envelopes. However, the present inventor has now determined that this background design is not suitable for the manufacture of envelopes that employ expanded slit sheet material cushioning.

SUMMARY OF THE INVENTION

The preferred embodiments overcome shortcomings in the above and/or other background art.

In accordance with some illustrative broad embodiments of the invention, the use of a paper sheet converted into various shapes including, for example, pleated paper, expanded slit sheet material and/or embossed papers, etc., as an inner cushioning layer combined with an outer paper sheet having embossments (such as, e.g., an embossed or indented Kraft sheet) as an outer material provides a lightweight, very protective, product that eliminates the need for plastics or heavier weight paper alternatives.

1. According to some preferred embodiments, a protective product comprises:
   at least one expandable slit paper sheet, said at least on expandable slit paper being expanded between opposing ends of said slit paper;
   a first embossed paper sheet facing said expanded slit paper sheet and
   a second paper sheet facing an opposite side of said at least one expanded slit paper sheet,
   at least one of said first embossed paper sheet and said second paper sheet being fixed to said expanded slit paper sheet at the opposing ends of said expanded slit paper sheet and thereby maintaining said expanded paper in its expanded state, said first embossed paper sheet having a plurality of embossings that increase the rigidity of said embossed paper sheet, whereby inhibiting deformation of said embossed paper sheet that is fixed to said expanded slit sheet paper.

2. In some embodiments according to 1 above:
   said plurality of embossings in said embossed paper sheet include an array of embossed shapes distributed on a face of said embossed paper sheet.

3. In some embodiments according to any of 1-2 above:
   said array of embossed shapes includes an array of polygons that share a side with an adjacent polygon.

4. In some embodiments according to any of 1-3 above:
   said array of embossed shapes includes an array of hexagons that share a side with an adjacent hexagon.

5. In some embodiments according to any of 1-4 above:
   said plurality of embossings include a plurality of ribs that extend across a substantial portion of a face of said embossed sheet.

6. In some embodiments according to any of 1-5 above:
   said embossings include indentations that extend inwardly towards said expanded slit sheet paper.

7. In some embodiments according to any of 1-6 above:
   said embossings extend inwardly from a plane of said embossed paper sheet a distance that adds rigidity to said embossed paper sheet and is less than 0.1 inches, thereby inhibiting deformation of said embossed paper sheet that is fixed to said expanded slit sheet paper.

8. In some embodiments according to any of 1-7 above:
   said first embossed paper sheet, said expanded slit paper, and said second paper sheet being folded along a fold line and fixed together forming a pouch region.

9. In some embodiments according to any of 1-8 above:
   said first embossed paper sheet, said expanded slit paper, and said second paper sheet being folded along a fold line and fixed together forming a pouch region.

10. In some embodiments according to any of 1-9 above:
    said protective product is an envelope having a flap region that is foldable to enclose said pouch region.

11. In some embodiments according to any of 1-10 above:
    said first embossed paper sheet, said expanded slit paper, and said second paper sheet are fixed together with an adhesive within said flap region, and said the flap is crushed at least in the flap region containing an adhesive.

12. In some embodiments according to any of 1-11 above:
    the region of said fold line is free of adhesive.

13. In some embodiments according to any of 1-12 above: said second paper sheet is embossed.

14. In some embodiments according to any of 1-13 above: said second paper sheet has embossments that alternate between being recessed and being raised.

15. In some embodiments according to any of 1-14 above: said first embossed paper sheet has embossings that extend inwardly from a plane of said embossed paper sheet a distance of less than 0.1 inches from a plane of said embossings said distance being sufficient to add rigidity to said embossed paper and inhibit deformation of said embossed paper sheet that is fixed to said expanded slit sheet paper.

16. In some embodiments according to any of 1-15 above: said distance is less than 0.05 inches.

17. In some embodiments according to any of 1-16 above: said distance is less than 0.03 inches.

18. In some embodiments according to any of 1-17 above: said slit sheet paper is extensible paper having an extensible range measured in a pre-slit configuration, of 1 to 20% in the machine direction.

19. In some embodiments according to any of 1-18 above: said slit sheet paper is extensible paper having an extensible range measured in a pre-slit configuration, of 3 to 20% in the machine direction.

20. In some embodiments according to any of 1-19 above: said slit sheet paper is extensible paper having an extensible range measured in a pre-slit configuration, of 3 to 9% in the machine direction.

21. In some embodiments according to any of 1-20 above: the slit sheet paper is a paper having a weight in the range from about 30 to 50 pounds per 3,000 sq. ft.

22. In some embodiments according to any of 1-21 above: said first embossed paper sheet and said second paper sheet are free from being fixed to said expanded slit paper sheet across a substantial portion of the area of said expanded slit paper sheet.

23. In some embodiments according to any of 1-22 above: said embossed paper sheet contacts but is free from connection to said expanded slit paper sheet at the sides of said first embossed paper sheet.

24. In some embodiments according to any of 1-23 above: said protective product is a recyclable paper product.

25. In some embodiments according to any of 1-24 above: said protective product is an envelope having a pouch including said embossed paper sheet and said expanded slit paper together folded to form front and back walls of said pouch and fixed together at the sides of said pouch, wherein said embossed paper sheet contacts but is free from connection to said expanded slit paper sheet at the sides of said pouch, and said embossed paper sheet is fixed to said expanded slit paper sheet at the peripheral ends of said expanded slit paper sheet and thereby maintaining said expanded paper in its expanded state.

26. In some embodiments according to any of 1-25 above: said embossed paper sheet and said expanded slit paper are together folded to form front and back walls of said pouch and are fixed together at the sides of said pouch with an adhesive.

27. In some embodiments according to any of 1-26 above: said at least one expanded slit paper sheet in an expanded state includes a plurality of expanded slit paper sheets in an expanded state layered alongside each other.

28. In some embodiments according to any of 1-27 above: said plurality of expanded slit papers sheets includes two expanded slit paper sheets, and further including a second embossed paper sheet facing an opposite side of said two expanded slit paper sheets.

29. In some embodiments according to any of 1-28 above: said embossings of said embossed paper sheet are indented towards said at least one expanded slit paper sheet.

30. In some embodiments according to any of 1-29 above further including: an address label fixed to said envelope.

31. In some embodiments according to any of 1-30 above: said protective product is an envelope; and said embossings of said embossed paper sheet are bulged outwardly from said at least one expanded slit paper sheet and face into an interior of a pouch of said envelope, whereby said embossings help to limit friction applied to an item that is inserted into said pouch.

32. In some embodiments according to any of 1-31 above, wherein the embossments are hexagons.

33. In some embodiments according to any of 1-32 above, wherein adjacent hexagons share a side, whereby the hexagons are connected.

34. In some embodiments according to any of 1-33 above, wherein said plurality of embossings are sufficient to counter the inherent tendency of the expanded slit paper to retract and thereby inhibit the wrinkling of the embossed paper.

35. In some preferred embodiments, a method comprises: providing the protective product of any of 1-34 above; and
placing an item within a pouch of said protective product with said expanded slit paper sheet providing cushioning to protect said item within said pouch and with said embossed paper inhibiting deformation of said embossed paper sheet that is fixed to said expanded slit sheet paper.

36. In some preferred embodiments, a method comprises: providing the protective product of any of 1-34 above; and
placing an item within said envelope with said expanded slit paper sheet providing cushioning to protect said item within said envelope and with said embossed paper inhibiting deformation of said embossed paper sheet that is fixed to said expanded slit sheet paper.

37. In some preferred embodiments, an envelope comprises:
at least one expanded slit paper sheet in an expanded state;
a first paper sheet facing a first face of said at least one expanded slit paper sheet and fixed in relation to said at least one expanded slit paper sheet along at least two opposite peripheral ends of said at least one expanded slit paper sheet;
a second paper sheet facing said at least one expanded slit paper sheet on an opposite face of said at least one expanded slit paper sheet from said first paper sheet and fixed in relation to said at least one expanded slit paper sheet along at least along at least two opposite peripheral ends of said at least one expanded slit paper;
wherein either a) said first paper sheet and said second paper sheet are embossed sheets having a plurality of embossments that inhibit deformation of said first and second paper sheets due to contraction forces of said at least one expanded slit paper sheet or b) said first paper sheet and said second paper sheet are non-embossed sheets having a heavier weight compared to a weight of said at least one expanded slit paper sheet that inhibit deformation of said first and second paper sheets due to contraction forces of said at least one expanded slit paper sheet.

38. In some embodiments according to 37 above, one of said first paper sheet and said second paper sheet is a non-embossed Kraft sheet having a weight of 40 #paper or more under the TAPPI standard paper weight specification for 3000 square feet and said second paper sheet is embossed.

39. In some embodiments according to any of 37-38 above, said at least one expanded slit paper sheet is at least one substantially rectangular sheet that is fixed to at least one of the first paper sheet and the second paper sheet only at two opposite end regions of said at least one expanded slit paper sheet.

40. In some embodiments according to any of 37-39 above, said two opposite end regions of said at least one expanded slit paper sheet are opposite ends of said at least one expanded slit paper sheet in an expansion direction of the at least one expanded slit paper sheet.

41. In some embodiments according to any of 37-40 above, said at least one expanded slit paper sheet includes two expanded slit paper sheets that are alongside and directly contact each other.

42. In some embodiments according to any of 37-41 above, one of said first paper sheet and said second paper sheet is a non-embossed Kraft sheet having a weight of 60 #paper or more under the TAPPI standard paper weight specification for 3000 square feet.

43. In some embodiments according to any of 37-42 above:
said first paper sheet and said second paper sheet contact said at least one expanded slit paper sheet across a substantial portion of the area of said at least one expanded slit paper sheet but are free from connection to said at least one expanded slit paper sheet across said substantial portion of the area of said at least one expanded slit paper sheet.

44. In some embodiments according to any of 37-43 above said envelope has a pouch including a cushioning walls, with the second paper sheet being an interior layer forming an interior wall of the pouch, the first paper sheet being an exterior layer forming an exterior wall of the pouch, and the at least one expanded slit paper sheets being between the interior layer and the exterior layer.

45. In some embodiments according to any of 37-44 above said cushioning wall of said pouch is folded along a fold line such that the cushioning wall forms both front and back walls of said pouch and such that said first paper sheet is an exterior layer on both front and back faces of the front and back walls of said pouch and wherein adhesive is applied along said fold line to at least one of said first paper sheet and second paper sheet.

46. In some embodiments according to any of 37-45 above the back wall of said pouch is longer than the front wall of said pouch, and wherein a portion of said first paper sheet that extends beyond an end of the front wall has an adhesive strip fixed thereto with a removable release liner for adhesively closing said envelope by removing the release liner and adhering said adhesive strip to the front wall.

47. In some embodiments according to any of 37-46 above the back wall of said pouch is longer than the front wall of said pouch and forms a flap region, and wherein a portion of said first paper sheet and said second paper sheet contact said at least one expanded slit paper sheet and are fixed together with an adhesive and at least said portion is crushed to flatten said at least one expanded slit paper and stiffen at least a portion of said flap region.

48. In some embodiments according to any of 37-47 above said envelope has a pouch including a cushioning wall, wherein said cushioning wall has four layers, with the first paper sheet forming a first of the four layers and being an exterior layer forming exterior walls of the pouch, the two expanded slit paper sheets forming second and third layers of the four layers in between the first and fourth layers and with the second and third layers in direct contact with each other, and the second paper sheet forming the fourth of the four layers and being an interior layer forming interior walls of the pouch.

49. In some preferred embodiments, a method comprises:
providing the envelope of any of 37-48 above; and
placing an item within a pouch of said envelope with said at least one expanded slit paper sheet providing cushioning to protect said item within said pouch.

50. In some preferred embodiments, a method of making an envelope comprises:
providing at least one expandable slit paper sheet;
providing a first paper sheet for facing a first face of said at least one expandable slit paper sheet;
providing a second paper sheet for facing the at least one expanded slit paper sheet on an opposite face of the at least one expanded slit paper sheet from the first paper sheet;
expanding the at least one expanded slit paper sheet to an expanded state and fixing the at least one expanded slit paper sheet at at least opposite portions of a periphery of the at least one expanded slit paper sheet in relation to the first paper sheet and the second paper sheet;
inhibiting deformation of said first and second paper sheets in response to contraction forces of said at least one expanded slit paper sheet by either a) providing the first paper sheet and the second paper sheet with a plurality of embossments or b) providing the first paper sheet and the second paper sheet as non-embossed sheets having a heavier weight compared to a weight of the at least one expanded slit paper sheet sufficient to inhibit deformation of the first and second paper sheets.

51. In some embodiments according to 50 above said step of inhibiting deformation of said first and second paper sheets in response to contraction forces of said at least one expanded slit paper sheet includes providing each of the first paper sheet and the second paper sheet as non-embossed sheets each having a weight of 40 #or more under the TAPPI standard paper weight specification for 3000 square feet.

52. In some embodiments according to any of 50-51 above, further including providing the at least one expanded slit paper sheet as at least one substantially rectangular sheet and fixing the at least one expanded slit paper sheet to at least one of the first paper sheet and the second paper sheet only at two opposite end regions of said at least one expanded slit paper sheet.

53. In some embodiments according to any of 50-52 above, said fixing the two opposite end regions of said at least one expanded slit paper sheet includes fixing opposite ends of said at least one expanded slit paper sheet in an expansion direction of the at least one expanded slit paper sheet.

54. In some embodiments according to any of 50-53 above, further including providing said at least one expanded slit paper sheet with two expanded slit paper sheets that are alongside and directly in contact with each other.

55. In some embodiments according to any of 37-48 above, said at least one expanded slit paper sheet in an expanded state being formed from an extensible paper made to be extensible in the machine direction and the cross direction without said slit pattern, said extensible paper having an extensibility within a range of 3 to 20% in the machine direction.

56. In some embodiments according to 55 above, said extensibility is within a range of 3-15% in the machine direction.

57. In some embodiments according to any of 37-48 above, said slit sheet paper has a weight, prior to expansion, from about 30 to 50 pounds per 3,000 sq. ft.

58. In some embodiments, a method comprises the steps of:
continuously passing a series of envelope units, that are the combination of the first paper sheet, the at least one expanded sheet and the second paper sheet that have been fixed together, in a straight line flow between a rotary die cutting and crushing tool and a rotary mandrel and thereby applying back pressure,
said rotary tool having a crushing component that crushes a portion of a flap forming region of said combination and a cutting component that cuts an envelope unit from the series of envelope units to form a single envelope unit,
said rotary die having an outer circumference that is equal to the total length of the envelope that is being made.

59. In some embodiments, a protective product comprises:
at least one cushioning paper sheet, said at least on cushioning paper sheet being an expandable slit paper, a fan folded paper, or a double sided embossed paper sheet,
a first embossed paper sheet facing said at least one cushioning paper sheet and
a second paper sheet facing an opposite side of said at least cushioning paper sheet,
at least one of said first embossed paper sheet and said second paper sheet being fixed to said cushioning paper sheet said first embossed paper sheet having a plurality of embossings that increase the rigidity of said embossed paper sheet, whereby inhibiting deformation of said embossed paper sheet that is fixed to said expanded slit sheet paper.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/ or advantages of particular embodiments should not be construed as limiting other embodiments or the claims.

BRIEF DESCRIPTION OF DRAWINGS

A number of preferred embodiments of the invention will be described with the accompanying drawings, in which:

FIGS. 11, 11A, 11B, 11C, and 11D are schematic representation of various patterns and sizes of hexagonal shaped embossments;

DEFINITIONS RELATING TO THE PREFERRED EMBODIMENTS

Figure 1:
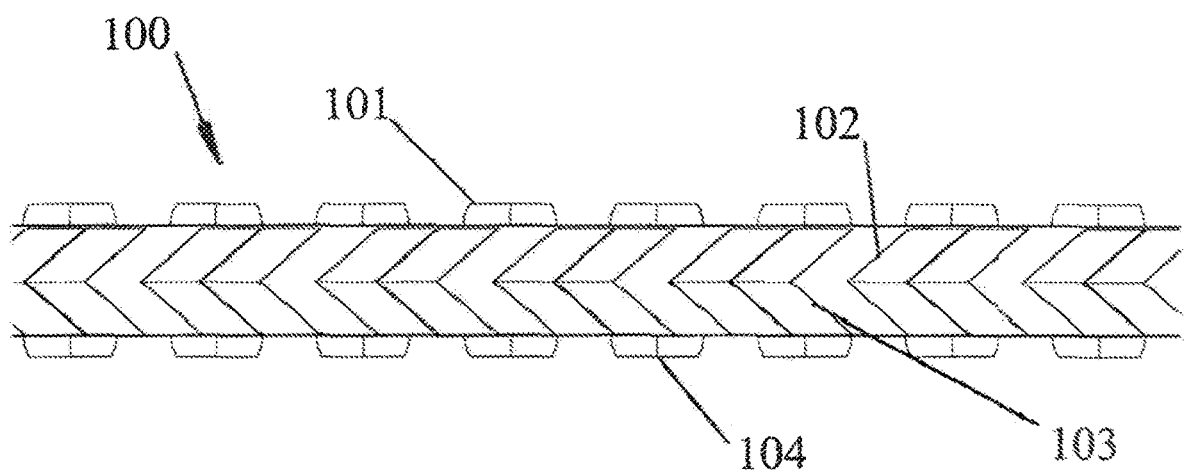
FIG. 1 is a side view of the composite material of expanded slit sheets enveloped in indented Kraft sheets.

In the preferred embodiments, the term "envelope" is a package having an opening within which one or more item(s) can be inserted for storage and/or shipping. In some preferred embodiments, the opening of an "envelope" is closeable and sealable after the item or items is inserted for storage and/or shipping, such as, e.g., shipping via shipping services.

In the preferred embodiments, the term "pouch" refers to an area within an envelope in which one or more item(s) for storage and/or shipment is placed. In some preferred embodiments, the filled envelope can be placed within a shipping container.

In some preferred embodiments, the term "in-the-box shipping" of envelopes refers to a context in which an envelope is shipped within a box or container (such as, e.g., within a corrugated box). For example, such box or container can be employed to ship a plurality of envelopes contained therein and/or one or more envelope along with any other number of items. In the context of in-the box shipping of an envelope, the materials of the envelope can be modified, such as, e.g., to employ lighter paper and/or to not employ a durable and/or anti-rip outer layer which may otherwise be required which shipping the envelope without the protection of a surrounding box during in-the box shipping.

In the preferred embodiments, the terms "outer layer" and "exterior layer" means, in regard to an envelope, an outermost layer of the envelope.

In the preferred embodiments, the terms "inner layer" and "interior layer" mean, in regard to an envelope, a layer of the envelope that forms an interior surface of the envelope. For example, an item placed within an envelope would typically be in contact with an interior surface of the envelope.

In the preferred embodiments, the term "mailing envelope" refers to an envelope designed for shipping by USPS, UPS, FedEx and/or the like without being contained within a box or container as in the case of in-the box shipping. In the preferred embodiments, a mailing envelope preferably has a durable outer layer to compensate for shipping by itself without external protection of a box or container (e.g., to avoid ripping or tearing).

In the preferred embodiments, the terminology "uniformly opening slit" means slits as disclosed and/or claimed in PCT/US2014/054615.

In the preferred embodiments, the terminology "randomly opening slit" means slits as disclosed and/or claimed in U.S. patent application publication 2017/0203866, published Jul. 20, 2017. In some examples of this latter '866 publication, at least some adjacent layers have differing angles of inclination of land areas, resisting contraction and/or nesting.

In the preferred embodiments, the terminology "expandable" as applied to paper sheets, means a paper having a slit pattern that enables expansion of the paper, such as, e.g., as disclosed in U.S. Pat. Nos. (a) 5,538,778, (b) 5,667,871, (c) 5,688,578, and (d) 5,782,735 and in PCT Application No. PCT/US2014/054615, the entire disclosures of which patents and PCT application are all incorporated by reference herein as though recited in full. In the preferred embodiments, a slit pattern is configured to enable the paper to be expanded lengthwise, with a related decrease in width. In some embodiments, the slit pattern produces a paper that increases in length due to the slit pattern when processed in an expander, such as, e.g., an expander of the type described in any of the following U.S. and PCT applications (a) 2017/0203866, (b) 2018/022266, (c) 2018/0127197, and (d) PCT/US2014/054615, incorporated herein by reference in their entireties.

In the preferred embodiments, the term "slit sheet" means an expandable paper sheet having a slit pattern, such as, e.g., disclosed in U.S. application publications (a) 2017/0203866, (b) 2018/0222665, and (c) 2018/0127197 and in PCT application PCT/US2014/054615, incorporated herein by reference in their entireties.

In the preferred embodiments, the term "envelope pad" includes a pad that is incorporated in an envelope to protect one or more item contained within the envelope. In some preferred embodiments, an envelope refers to the intermediate manufacturing process where the envelope has been cut and crushed to enable the next step of folding and gluing into its final envelope form.

In the preferred embodiments, the term "padded envelope" refers to a final envelope product design that provides a cushioning flexible shipping package.

In the preferred embodiments, the term "mouth" refers to a portion of the envelope that allows one or more item(s) to be placed within the envelope. In some embodiments, the mouth is formed when an envelope pad is glued into the shape of a padded envelope to create a pouch.

In the preferred embodiments, the term "extensible" as applied to paper sheets, means a paper as set forth in co-pending U.S. patent application Ser. No. 16/018,702, entitled Extensible Paper and Its Use In the Production of Expanded Slit Packaging and Void Fill Products, the entire disclosure of which is incorporated herein by reference. In addition, the term "extensible" as applied to paper sheets also includes paper that is processed such that a paper sheet is able to stretched, including extensible papers as described in the following U.S. Patents, Patent publications, and pending applications: (a) U.S. Pat. No. 3,908,071, (b) U.S. patent application Ser. No. 14/901,977 (U.S. Pat. No. 9,945,077), (c) PCT Publication No. WO1984002936, (d) U.S. Application Publication No. US2002/0060034, (e) U.S. Application Publication No. US2007/0240841 (U.S. Pat. Nos. 7,918,966), (f) 3,104,197, (g) 3,220,116, (h) 3,266,972, (i) 3,269,393, (j) 3,908,071, (k) 6,024,832, (l) 6,458,447, and (m) 6,712,930, the disclosures of which are all incorporated by reference herein, as though recited in their entireties.

In some illustrative preferred embodiments, an extensible paper employed has an extensible range, as measured in a pre-slit configuration, of 3 to 20% in the machine direction. In some illustrative preferred embodiments, an extensible paper employed has an extensible range, as measured in a pre-slit configuration, of 3 to 15% in the machine direction. In some illustrative preferred embodiments, an extensible paper employed has an extensible range, as measured in a pre-slit configuration, of not less than 5% in both the machine direction and the cross direction. In some illustrative preferred embodiments, an extensible paper employed has an extensible range, as measured in a pre-slit configuration, of 3 to 20% in the machine direction. In some illustrative preferred embodiments, an extensible paper employed has an extensible range, as measured in a pre-slit configuration, of from 1-9% in a machine direction and 1-5% in a cross direction. In some illustrative preferred embodiments, an extensible paper employed has an extensible range, as measured in a pre-slit configuration, of from 3-9% in the machine direction and not less than 5% in the cross direction. In some illustrative preferred embodiments, an extensible paper employed has an extensible range, as measured in a pre-slit configuration, of 3-11.1% in the machine direction, or, in some embodiments of 3.3-10.6% in the machine direction.

In some preferred embodiments, the extensible paper is a non-woven fibrous material with fibre-to-fibre bonding that resists tearing upon 3-15% expansion in the machine direction as measured in a non-slit configuration.

In some preferred embodiments, the extensible paper is formed by being pre-compressed between two different members contacting opposite sides of the paper web. For example, in some embodiments, the extensible paper is formed by the paper web being pre-compressed between two different rollers having different roller surfaces and/or rotations, or the extensible paper is formed by the paper web being inserted between a roll and an endless pre-stretched blanket to compress the paper web with a nip bar and the blanket. In some preferred embodiments, the extensible paper is formed by being pre-compressed such as to create an extensible paper of a non-woven fibrous material with increased fibre-to-fibre bonding.

In the preferred embodiments, the term "stretching direction" refers to the direction in which a slit paper sheet is subjected to a pulling or stretching force. In the preferred embodiments, the stretching direction is transverse to the direction of the slits of the slit sheet material. In some preferred embodiments, the stretching direction is the machine direction.

In some preferred embodiments, an extensible paper can be formed using methods as described in U.S. Pat. No. 3,908,071, incorporated herein by reference in its entirety. For reference, the following is a direct quote of the paragraph on column 1, lines 4-19, of U.S. Pat. No. 3,908,071: "Extensible (compacted) paper produced, for example, in accordance with the apparatus and process disclosed in U.S. Pat. No. 2,624,245 has certain well recognized advantages and commercial uses. Such paper is subjected, while in a partially moistened condition, to compressive compaction in the direction of web movement (machine direction or MD) between a pressure nip, thus compacting and forcing the fibers together to produce an inherent stretchability without creping. Compacted paper has improved tensile energy absorption (TEA) burst and tear characteristics which are highly desirable for such end uses as the manufacture of paper sacks."

In some preferred embodiments, an extensible paper can be formed using methods as described in U.S. Pat. No. 6,024,832, incorporated herein by reference in its entirety. For reference, the following is a direct quote of the Abstract of U.S. Pat. No. 6,024,832: "A method for producing extensible paper, comprising the following stages: feeding a mix of vegetable fibres to a kneader member, mixing the mix with water in the kneader, beating the fibres to obtain a pulp, transferring the beaten pulp into a flow chest, feeding the beaten pulp from the flow chest onto a paper web formation cloth with consequent reduction of the water percentage by gravity and vacuum, pressing the web, with consequent further reduction of its water content, initial drying of the paper web to a substantially constant moisture content of between 15% and 65%, compacting, final drying to a moisture content of between 15% and 4%, preferably 10%-8%, glazing, wherein: the beating stage is carried out by rubbing the fibres in a multistage unit to obtain a pulp having a degree of beating of at least 30.degree. SR, the compacting stage is carried out between at least a pair of rollers of which one is of hard material comprising circumferential surface ribs and driven at greater speed, and the other is of soft material with a smooth surface and driven at lesser speed."

In some preferred embodiments, an extensible paper can be formed using methods as described in U.S. Pat. No. 9,945,077, incorporated herein by reference in its entirety. For reference, the following is a direct quote of the 2nd paragraph of the Background section of U.S. Pat. No. 9,945,077: "On the other hand, Clupak refers to equipment that inserts a paper web between a roll and an endless rubber blanket to compress the paper web with a nip bar and the rubber blanket, while at the same time the pre-stretched blanket shrinks to cause the paper web to also shrink and thereby increase its breaking elongation, and this equipment is used to provide increased breaking elongation to kraft paper used in heavy packaging applications as mentioned above." For further reference, the following is a direct quote of U.S. Pat. No. 9,945,077, column 6, first paragraph: "The manufacturing method using this Clupak system is such that a paper web is inserted between a roll and an endless rubber blanket to compress the paper web with a nip bar and the rubber blanket, while at the same time the pre-stretched blanket shrinks to cause the paper web to also shrink and thereby increase its breaking elongation. The Clupak system allows for adjustment of the breaking elongation of kraft paper in the longitudinal direction according to the ratio of the manufacturing speed on the inlet side of the Clupak system and manufacturing speed on the outlet side of the Clupak system, and also according to the pressurization force applied by the nip bar."

In some preferred embodiments, an extensible paper can be formed using methods as described in U.S. Pat. No. 3,104,197, incorporated herein by reference in its entirety. For reference, the following is a direct quote of the paragraph on column 2, lines 41-56 of U.S. Pat. No. 3,104,197: "The use of rubber or rubberous material in conjunction with a hard surface in the manner described is known in the treatment of paper as well as fabrics but only in a general way and the present invention includes the use of rubber considerably softer and more elastic than previously used. Also of great importance in the production of an extensible paper by creping it in this manner is the differential in speeds at which the rolls are driven. If the proper combination of hard and soft surfaces is provided, a semi-dry paper web passing through the nip of the rolls will be carried by the contracting rubber against the direction of web travel toward the nip and over the surface of the hard roll. This creates a uniformly compressed crepe in the paper web giving toughness, pliability, and extensibility."

In the preferred embodiments, the term "extensible slit sheet paper" means a paper that is both extensible and expandable as disclosed in U.S. patent application Ser. No. 16/018,702 (U.S. Application Publication No. U.S. 2018/0370702, published Dec. 27, 2018), the entire disclosure of which is incorporated herein by reference.

Figure 3:
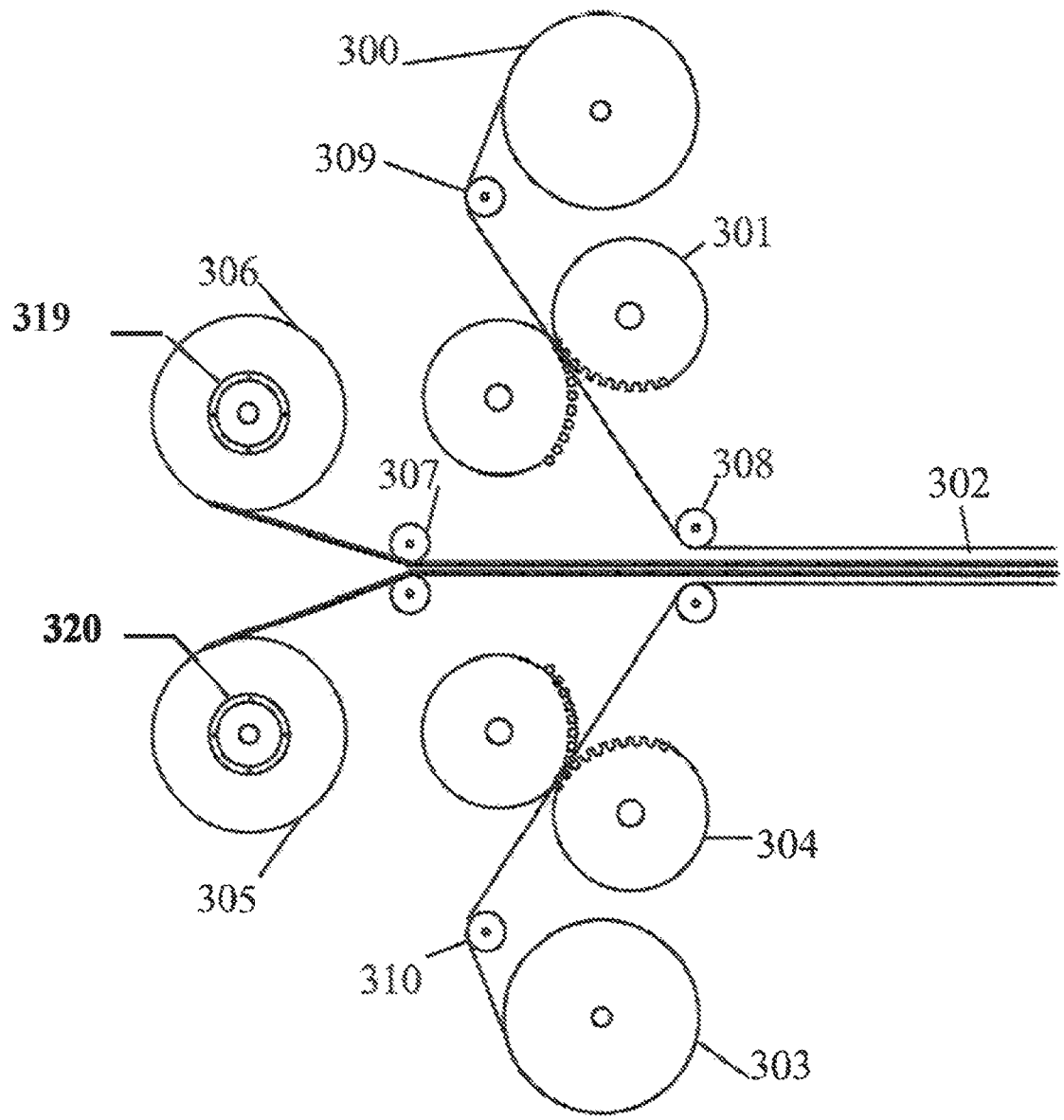
FIG. 3 is a schematic side view of the manufacturing process.

In the preferred embodiments, the term "embossed" means to raise and/or to lower a region of a sheet of paper. Most preferably, embossments involve raised and/or lowered regions of a sheet of paper which are raised and/or lowered by the application of a force such as to press the paper to assume an embossed shape in which the pressure causes deformation in the sheet of paper such as to have a shape including such raised and/or lowered regions. In some preferred embodiments, the sheet of paper is initially substantially planar and without the raised and/or lowered regions of the embossments in an initial state, and, then, the sheet of paper is pressed to cause deformation in the sheet of paper including raised and/or lowered regions. These raised and/or lowered regions from the original plane of the original planar sheet of paper are referred to, in the most preferred embodiments, as "embossed" regions or "embossments." By way of example, in the most preferred embodiments, embossments are created by pressing an initial sheet (e.g., a planar or substantially planar sheet) between opposing pressing surfaces, such as, e.g., (1) between die plates that are reciprocated relative to one another to press the surface of the planar sheet, wherein the die plates have a pattern of raised and lowered regions (e.g., male and female regions) that create a cross pressure on the face of the planar sheet to cause the sheet to deform and form embossments and/or (2) between two rollers (such as, for example, as shown in the embodiment of FIG. 3) wherein the rollers have a pattern of raised and lowered regions (e.g., male and female regions) that create a cross pressure on the face of the planar sheet to cause the sheet to deform and form embossments. In some embodiments, embossments can involve pressure applied by a single reciprocated die plate that has a raised/lowered embossment pattern that presses against a first surface of the paper, while an opposite side of the paper is pressed or supported by a resilient (e.g., rubber) member that flexibly receives the raised and/or lowered portions to cooperative cause embossments in the paper sheet. Similarly, in some embodiments, embossments can involve pressure applied by a single roll die that has a raised/lowered embossment pattern that presses against a first surface of the paper, while an opposite side of the paper is pressed or supported by a resilient (e.g., rubber) roll member, or other surface member, such as a conveyor or other member, that flexibly receives the raised and/or lowered portions to cooperative cause embossments in the paper sheet In some preferred embodiments, embossments are formed in a repeating pattern along a conveyed sheet of paper that is conveyed from an initial roll. In some preferred embodiments, the embossments define discrete shapes that are displaced from the original plane of the paper (e.g., raised and/or lowered) within separated regions along the face of the sheet of paper. In some preferred embodiments, these discrete regions can have an irregular shape, while in some embodiments, these discrete regions can have a circular shape, elliptical shape, oval shape, polygonal shape, triangular shape, square shape, pentagonal shape, hexagonal shape, octagonal shape and/or other shapes. In the most preferred embodiments, the embossments have a hexagonal shape. Here, the terminology "shape" of the embossments in the above paragraph refers to the shape of the embossments as viewed downwardly towards a face of the paper sheet. It should be understood that, as seen in a side view (such as, e.g., in side views similar to that shown in FIGS. 10 and 12-15, such embossments have a different shape).

In some preferred embodiments, the embossments can have a substantially flat or consistent peak height or displacement height from the original plane of the sheet of paper. For example, as shown in the above-noted FIGS. 10 and 12-15, the peak heights of the embossments are substantially consistent. In this regard, in the preferred embodiments, the peak heights of the embossments are preferably substantially consistent along and within each individual embossment. In addition, in the preferred embodiments, the peak heights of the embossments are preferably substantially consistent between a plurality of embossments, such that embossments extending in a certain direction (e.g., a raised direction or a lowered direction) have a substantially consistent peak height along the face of the sheet. In some embodiments, embossments can extend by raised and lowered and the peak heights can differ on each opposite side of the sheet, but are preferably substantially consistent on the respective sides of the sheet.

In addition, in some preferred embodiments, the peaks of the embossments are substantially planar or include a substantially planar central area which can taper or can be rounded at edges of the peaks of the embossments. Moreover, in some preferred embodiments the peripheries of the embossments preferably extend substantially transverse from the original plane of the paper sheet. This structure can be seen, e.g., in the above-noted FIGS. 10 and 12-15 by way of example. Moreover, in some embodiments the peripheries of the embossments that extend substantially transverse to the original plane of the paper sheet extend substantially perpendicular to the plane of the paper sheet. In some other embodiments, similar to that shown in FIGS. 13-15, the peripheries of the embossments that extend at an angle to the original plane of the paper sheet and be inclined towards the embossment region. In some embodiments, this angle of inclination can be as shown in various embodiments in the figures. In some embodiments, this angle of inclination can be between about 45-90 degrees, or between 60-90 degrees, or between 70-90 degrees, or between 80-90 degrees. Some illustrative embodiments would have an angle that is between about 65-85 degrees.

In some embodiments, the embossments can be in a pattern (such as, e.g., an array) of embossments in which at least some of the embossments are discretely located in separate positions on the sheet of paper (e.g., such that discrete embossments are surrounded by portions having the original plane of the sheet of paper).

In some embodiments, the embossments can be in a pattern (such as, e.g., an array) of embossments in which at least some of the embossments are not entirely discretely located at separate positions on the sheet of paper. For example, in some embodiments, the embossments can be located adjacent one another, or can be connected together. For example, in some embodiments, thin or elongated or linear embossments (such as, e.g., raised rail-shape embossments or lowered groove-shape embossments can extend between embossed regions. However, in the most preferred embodiments, at least some, and preferably, most of the embossments would have peripheries that are largely surrounded by portions having the original plane of the sheet of paper. For example, in many cases, the peripheries of the embossments would mostly be surrounded by portions having the original plane of the sheet of paper.

In the preferred embodiments, embossments are applied to individual sheets of paper such as to create a pattern of embossment within the individual sheet of paper. In the preferred embodiments, embossments do not adhere multiple sheets of paper together. In the preferred embodiments, embossments create raised and/or lowered regions that, in fact, help to separate adjacent layers (e.g. adjacent layers of paper) by displacing the original plane of the embossed sheet from an adjacent sheet due to the added peak height of the embossments. In some embodiments where an embossed sheet is to be attached to an adjacent sheet, such attachment can be by gluing and/or otherwise attaching to the adjacent sheet. This is in contrast to use of techniques, such as, e.g., knurling, that can be used to attach adjacent sheets.

In some preferred embodiments, the term embossed includes raising and/or lowering a surface of a sheet of paper (e.g., Kraft paper) and encompasses recessed embossments, raised embossments, and an embossments that is both raised and recessed.

In some preferred embodiments, the term "recessed embossments" means to lower the surface (sunk-relief) of a sheet of paper (e.g., Kraft paper) relative to an adjacent layer.

In some preferred embodiments, the term "raised embossment" means to raise the surface of a sheet of paper (e.g., Kraft paper) relative to an adjacent layer.

In some preferred embodiments, an "embossed" region of a paper sheet includes a region of the paper sheet in which a plane of the embossed region of the paper sheet is displaced from a plane of a non-embossed region of the paper sheet adjacent to the embossed region of the paper sheet.

DESCRIPTION OF THE PREFERRED EMBODIMENTS OF THE INVENTION

While the present invention may be embodied in many different forms, the illustrative embodiments are described herein with the understanding that the present disclosure is to be considered as providing examples of the principles of the invention and that such examples are not intended to limit the invention to preferred embodiments described herein and/or illustrated herein.

In the most preferred embodiments of the present invention, the invention employs "expanded slit sheet" material in combination with an exterior layer of "embossed" paper to produce a padded envelope with cushioning properties. In addition to the additional patent and other publications incorporated herein by reference in this application, the entire disclosures of U.S. Pat. No. 2,856,323, describing the manufacture of "embossed" paper, and of U.S. Pat. No. 10,226,907, U.S. Application Publication No. 2018/0222665, U.S. Application Publication No. 2018/0127197, and U.S. Application Publication No. 2018/0370702, describing "expanded slit sheet" manufacturing and designs, are all incorporated by reference herein as if recited in full.

Figure 4:
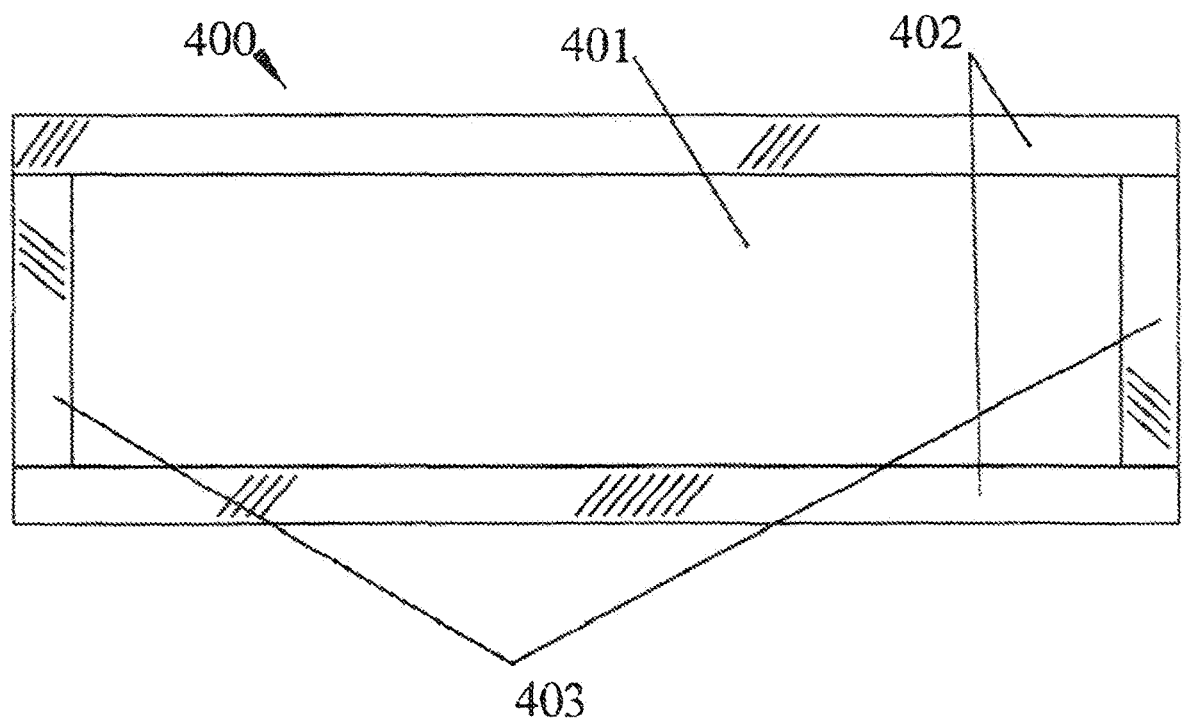
FIG. 4 is a top view of the composite material.

As shown in FIG. 1, the illustrated embodiment uses a four-layer composite starting with the first layer of embossed paper 104, laminated, on all edges (as shown in FIG. 4, reference numbers 402 and 403) to the two layers of expanded slit paper layers which can be, for example, as disclosed in U.S. Pat. No. 10,226,907, with a fourth top-layer of embossed paper. This produces a paper pad that is completely recyclable and that can be made mostly of recycled paper.

Figure 7:
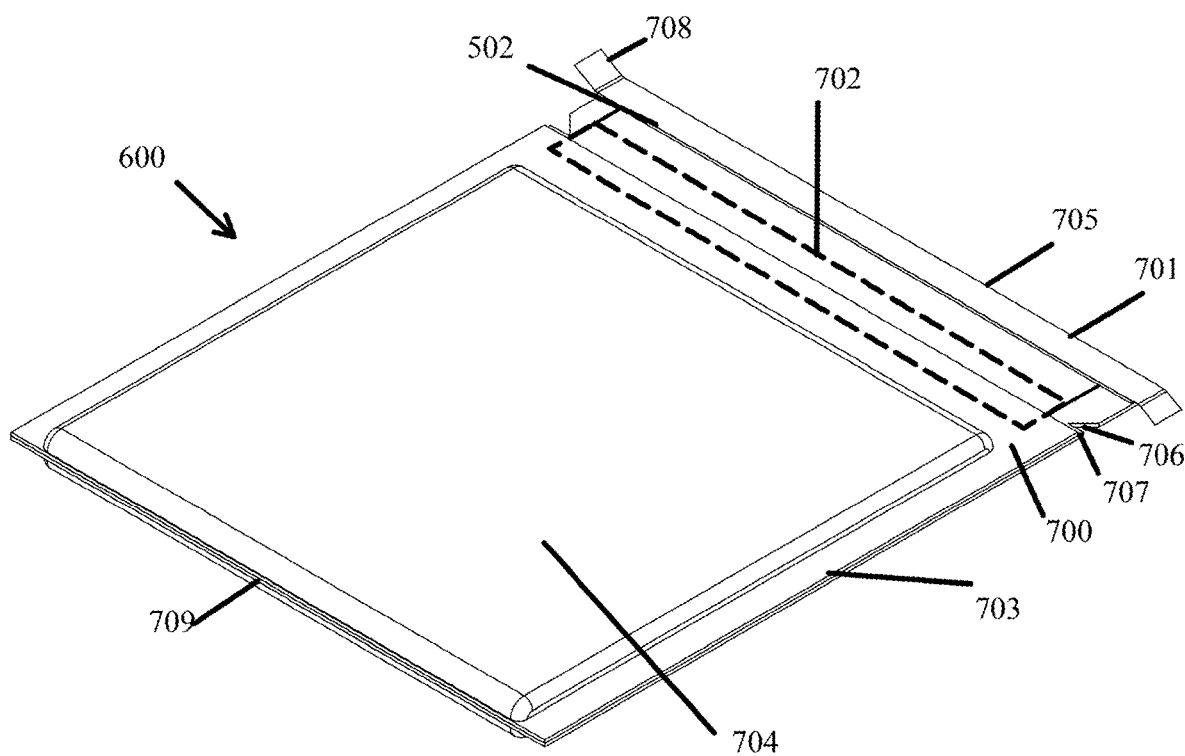
FIG. 7 is a perspective view of the composite unclosed envelope with release liner, where a pouch area is created by side gluing side crushing areas folding at a crush/fold area.

Following construction of the paper pad, in the preferred embodiments, two further steps are employed to make the envelope. The first is to fold the pad as shown in FIG. 7 so that a pouch area 704 is formed upon gluing together the laminated sides 703. Optionally, sides 703 can be crushed to provide rigidity and to flatten the side regions.

Figure 6:
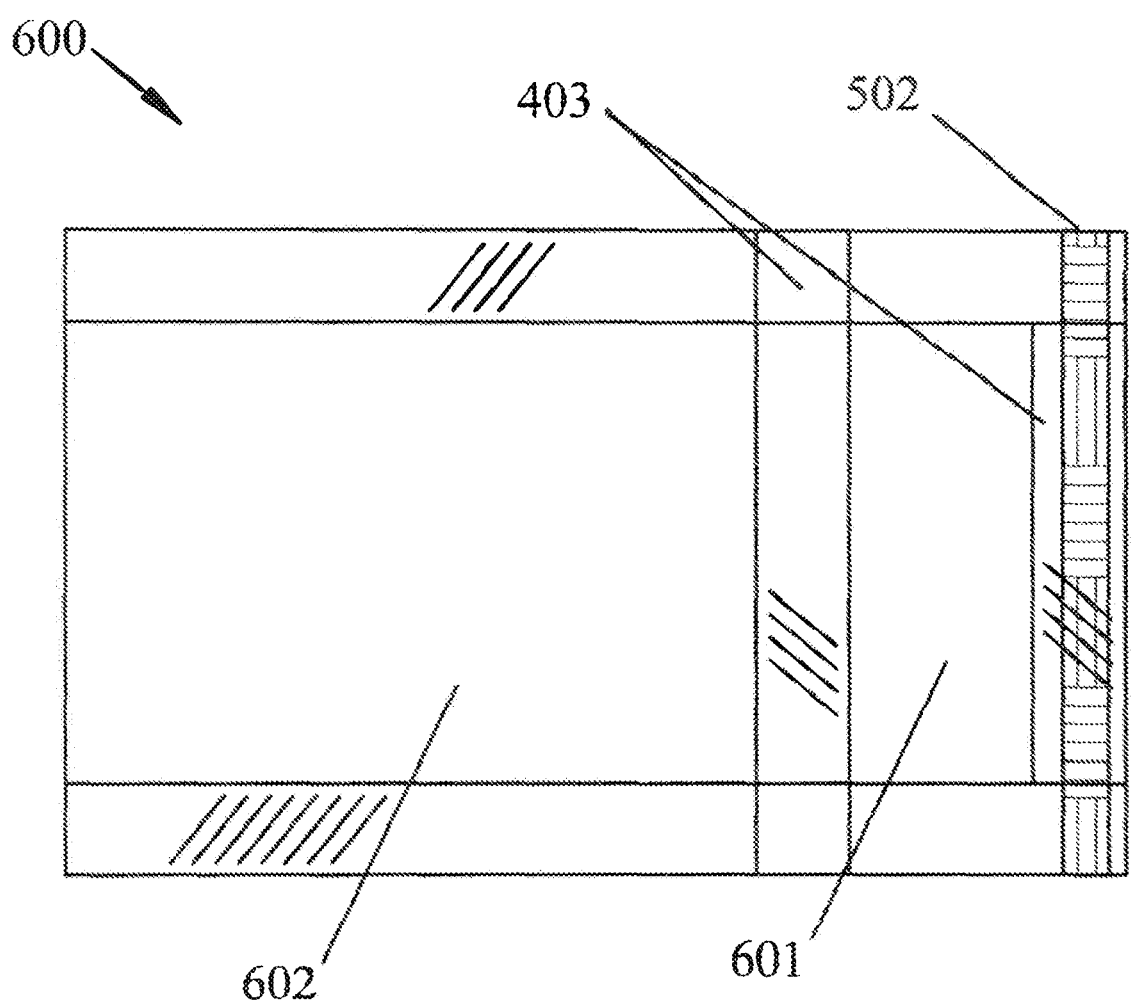
FIG. 6 is a top view of the composite material folded into the unclosed envelope shape.

In the preferred embodiments, a double-sided adhesive strip 502 (as shown in FIG. 6) is provided with a release liner 701 (as shown in FIG. 7), which release liner 701 covers the adhesive strip 502 and is removable to expose the adhesive strip 502 for closing of the envelope.

With reference to the top view of FIG. 4, the middle area 401 is where the expanded slit sheet will be placed and will further be placed on the areas 403 and the areas of 403 will be laminated with a layer of paper which can be embossed, as taught hereinafter.

Figure 2:
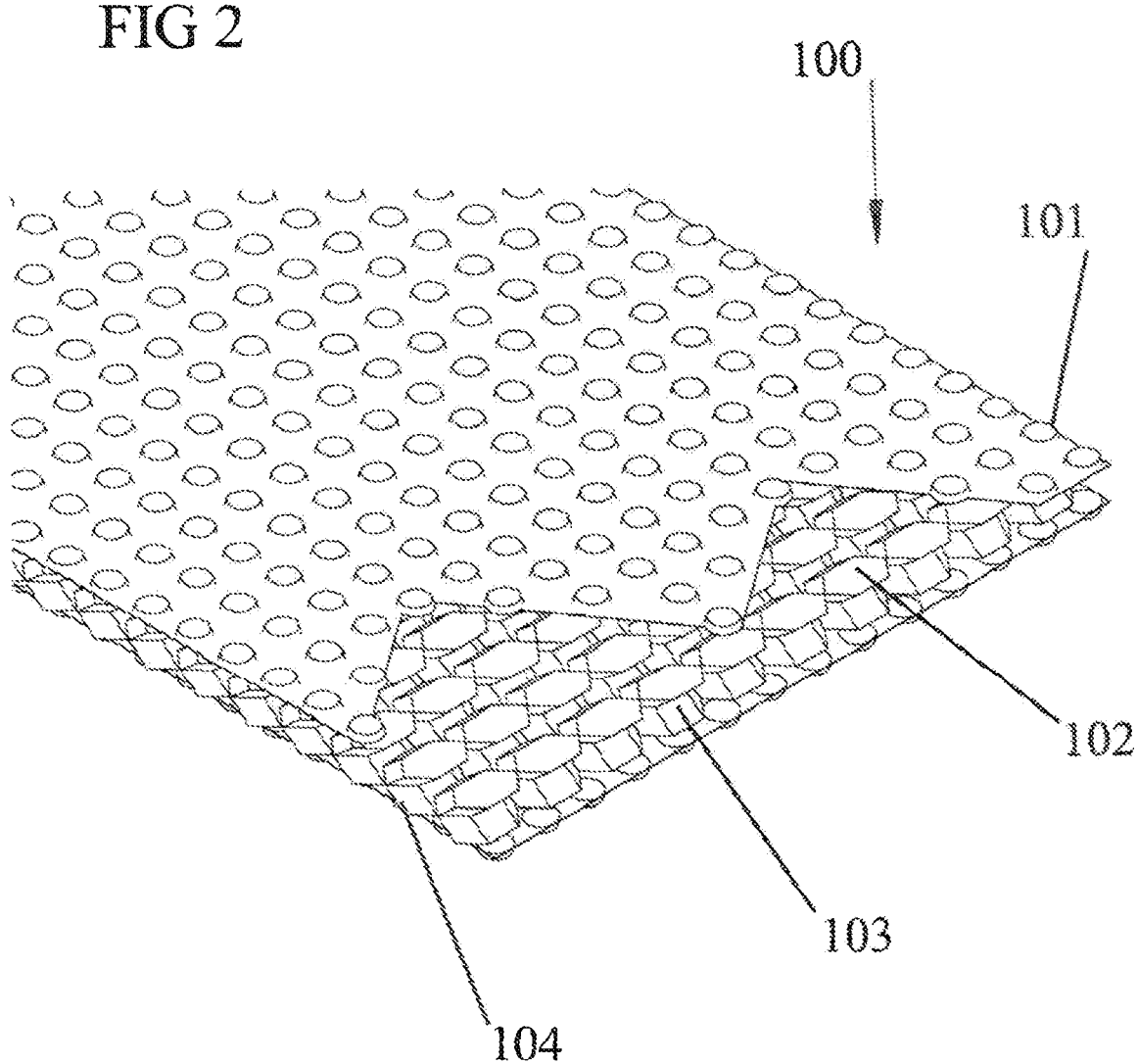
FIG. 2 is a perspective view of the composite material of expanded slit sheets enveloped in indented Kraft sheets.

With reference to FIG. 2, in the preferred embodiment, the expanded slit sheets 102 and 103, as shown, are the full length but not the full width of the embossed paper 101 and 104. It is not necessary for the expanded layers to fully extend in width. However, the expanded layers fully extend the length in the preferred embodiment. Referring to FIG. 4, the adhesion areas 403 trap the expanded slit sheet paper in between the embossed outer layer and the inner layer to keep and maintain the expanded slit sheet expanded such as to provide the cushioning and total thickness that the expanded slit sheet has to offer. The inner layer can be flat or embossed as disclosed hereinafter.

Although two layers of expanded slit sheet material are shown in FIG. 1, other embodiments can employ different numbers of layers of expanded slit sheet material. The envelope of the preferred embodiments of the present invention can be made with a single layer, two layers (as shown), or even three or more layers of expanded slit sheet material. Additionally, in some embodiments, one or more or all of the layers of expanded slit sheet material can employ expanded slit sheet material of chaotic cell structure as disclosed in U.S. Application Publication No. 2018/0127197, the entire disclosure of which is incorporated herein by reference.

In the preferred embodiments, the pouch, within the constructed envelope, is used by placing an item or article for shipping within the pouch area 704 (as shown in FIG. 7). Then, after the item or article is contained within the pouch area, the envelope is closed by exposing the adhesive of the adhesive strip by removing the release liner 701 (such as, e.g., by manually grasping the extension tab 708 and laterally pulling the release liner across the width of the envelope) and then folding the top portion of the pad at a fold position 707 (e.g., a fold line) to place the top portion of the pad onto the pouch area and enable the adhesive strip 502 to seal the envelope 600 by adhering to an outer surface of the pouch area 704.

In some preferred embodiments, an embossed paper can be an embossed paper as found within the art (such as, e.g., embossed paper as described in all patents and publications discussed in this application, which are all incorporated herein by reference in their entireties), and in the preferred embodiments the embossed paper is made with a Kraft paper having a weight in the range from about 40 to about 60 pounds, as per the TAPPI standard paper weight specification of 3,000 square feet. Advantageously, a paper weight equaling the basis weight of 50 pounds plus/minus 10% enables the envelope to perform in ways that were previously unexpected.

In the illustrative embodiment shown in FIGS. 1 and 2, the embossed paper 101 is formed with embossments that are made by using matching male-female dies that are pressed together such as to press or punch embossments into the paper, such as, e.g., as described in U.S. Pat. No. 2,856,323 (the entire disclosure of which is incorporated herein by reference), which shows circular embossments. The embossments are preferably distributed such as to create a unique stiffening property, while still enabling the flexibility that is required for placing items within the pouch. In the most preferred embodiments, a plurality of hexagonal embossments are provided. In the embodiment shown in FIGS. 1 and 2, the embossments are formed within the outer layer 101 of the envelope. Additionally, in the embodiment shown in FIGS. 1 and 2, embossments are also formed in the inner layer 104 of the envelope. As described herein, in some preferred embodiments, embossments are only provided in the outer layer 101 of the envelope and not within the inner layer 104 of the envelope. Moreover, although preferred embodiments include embossments in the outer layer 101, some embodiments can omit embossments in the outer layer 101, while including embossments in the inner layer 104, while yet other embodiments can omit embossments in both the outer layer 101 and the inner layer 104.

Figure 11C:
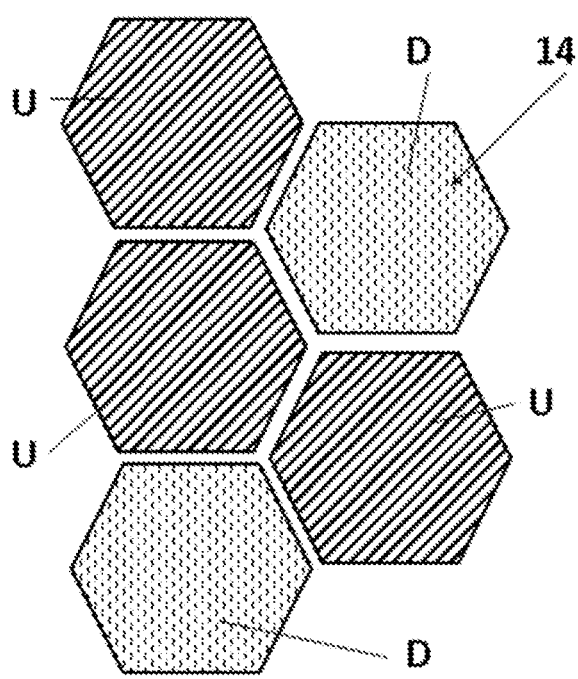

With reference to FIG. 11, this figure shows an illustrative embossment patterns that can be employed in some illustrative embodiments. In some implementations, an embossment pattern similar to that shown in FIG. 11 can be formed in a layer (such as, e.g., outer layer 101 and/or inner layer 104) by pressing a die configured to create an array of hexagonally shaped embossments. With reference to FIG. 11C, in some embodiments, each hexagonally shaped region 1403 (e.g., five such regions 1403 being shown for illustrative purposes in FIG. 11C) can be formed by a hexagonally shaped pressing member configured to be pressed into a paper sheet to create a hexagonally shaped embossment having a substantially or generally flat surface. Towards that end, the shaded regions in FIG. 11C (i.e., which shaded regions are within the hexagonally shaped regions 1403 in this example) represent embossments that are pressed such as to be displaced from the original plane of the paper sheet. In FIG. 11C, the white spaces between the hexagonally shaped embossments can be, e.g., at the original plane of the paper sheet.

In some embodiments, each of the hexagonally shaped regions 1403 are displaced from the original plane of the paper sheet in the same direction. For example, in some embodiments, all of the regions 1403 are displaced downwardly. In some other embodiments, all of the regions 1403 are displaced upwardly. In yet some other, and more preferred embodiments, some of the regions 1403 are displaced upwardly, and some of the regions 1403 are displaced downwardly. For example, in FIG. 11C, the regions 1403 shaded with an array of dashes are displaced downwardly as represented by the label D. On the other hand, in FIG. 11C, the regions 1403 shaded with diagonal lines are displaced upwardly as represented by the label U. In some embodiments, the variations in upward U and downward D displacements of the regions 1403 can be randomized. In some embodiments, the variations in upward U and downward D displacements of the regions 1403 can be in an alternating manner. In some embodiments, the variations in upward U and downward D displacements of the regions 1403 can be in a pre-set pattern.

Among other things, employing regions 1403 with both upward U and downward D displacements can substantially increase the strength and rigidity of the embossed layer. Additionally, by varying the directions of the embossments, less embossments can be formed to extend to a particular upward and/or downward side of the layer. Firstly, by extending some embossments in opposite directions, the number of embossments is necessarily less than if all embossments extended in a same direction. Secondly, by extending some embossments in opposite directions, a greater number of embossments can be set to extend in one direction than in the other direction. For example, in some embodiments, one side of the layer can have a lesser number of embossments so as to reduce a contact surface area in the event that an article or item is slid across the surface against the embossments. By way of example, this embodiment can be advantageous for reducing friction upon placing items within a pouch of the envelop by forming the inner layer 104 so as to have a reduced number of outwardly extending embossments, whereby a reduced contact surface area can be created to facilitate insertion and/or removal of items from within the pouch. For example, in the context of the insertion of flat articles or items (such as, e.g., paper or the like), a substantial decrease in contact friction can be achieved).

Figure 11D:
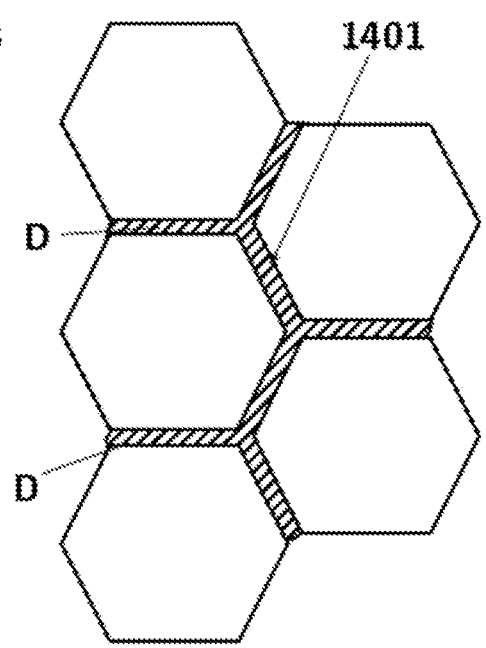

With reference to FIG. 11D, in some embodiments, rather than embossing across the entire areas of the regions 1403, embossment can be effected around the peripheries of such areas 1403. In particular, as shown in FIG. 11D, in some embodiments, the peripheral borderlines 1401 surrounding the hexagonal regions can be embossed. Towards that end, the peripheral borderlines 1401 that are shaded in FIG. 11D represent embossments that are pressed such as to be displaced from the original plane of the paper sheet. In FIG. 11D, the white spaces within the interiors of the hexagonal regions can be, e.g., at the original plane of the paper sheet.

Although the embodiment shown in FIG. 11D may have less structural rigidity that the embodiment shown in FIG. 11C, the embodiment shown in FIG. 11D can have some substantial advantages for some purposes. For example, as the "white regions" shown in FIG. 11D, which represent an original plane of the paper sheet encompasses a substantial majority of the surface and that substantial majority of the surface is at a substantially consistent height or substantially level, this embodiment can have substantial usefulness and advantage when such a substantially consistent or level surface is desired. For example, in some preferred embodiments, the outer layer 101 is embossed with an embossment patterns as shown in FIG. 11D. Among other things, having this embodiment pattern on an outer layer 101, an outer peripheral surface of the envelope (created by the outer layer 101) can be advantageously adapted to be able to receive a label (such as, e.g., an adhesive label), such as, e.g., a shipping label for using in shipping of the envelop. For example, such a label can include shipping information, such as, e.g., name and address of the intended recipient of the envelope, contents information related to the items contained within the envelop and/or other information related to the shipment or delivery of the envelope.

In some embodiments, such as, e.g., for use as an outer layer 101, the embossed peripheral borderlines 1401 of FIG. 11D preferably extend downwardly D (as shown in FIG. 11D). In this manner, the embossed region would not extend upwardly from the surface of the layer 101. Accordingly, the embossments would even more substantially avoid interference with the use of the outer surface of the outer layer 101.

In some implementations, an embossment pattern similar to that shown in FIG. 11 can be formed in a layer (such as, e.g., outer layer 101 and/or inner layer 104) by pressing a die having an array of protruding hexagonal shaped die press members that are each configured with a shape corresponding to the hexagon 1403 shown in FIG. 11. In some embodiments, the array of hexagons 1403 can, thus, be created by pressing the die against the layer for embossment (i.e., by sandwiching the layer between the die and a complementary shaped receiving die member placed on an opposite side of the layer being embossed).

For example, in some illustrative embodiments, an outer layer 101 can include an embossment pattern as shown in FIG. 11 in which the peripheral borderlines 1401 of the hexagons 1401 are recessed embossments (similar to that shown in FIG. 11D) and have a small depth. For example, in some embodiments, the depth can be less than 0.01", and, most preferably, can be a depth of about 0.005" (0.127 mm). In some illustrative embodiments, this depth value can be varied within a range about +/−50%, or, more preferably, within a range about +/−25%, or, mostly preferably within a range about +/−15%. Surprisingly, this small embossment pattern still provides a substantial resilience to the paper as well as a more luxurious and more protective feel and is highly advantageous as an outer layer 101. Moreover, in this latter embodiment, by having the embossment extend downwardly, the embossment substantially does not interfere with use of the paper for applying a label or other purposes.

As illustrated in the exemplary embossment patterns shown in FIG. 11, FIG. 11A and FIG. 11B, in various embodiments the sizes or dimensions of the hexagonal regions 1403 can be varied depending on circumstances. For example, in the example shown in FIG. 11, a diameter or distance between opposite walls of the hexagon is about 0.93' (i.e., 0.93 inches), while in the example shown in FIG. 11A, a diameter or distance between opposite walls of the hexagon is about 0.70' (i.e., 0.70 inches), while in the example shown in FIG. 11B, a diameter or distance between opposite walls of the hexagon is about 0.45' (i.e., 0.45 inches). While the diameters of such hexagonal regions 1403 can vary, in some embodiments, the diameter is preferably less than 2", and, more preferably, less than 1.5", and, more preferably, less than 1.0".

Moreover, in some embodiments in which embossments are employed on the outer layer 101 and the inner layer 104, the diameters of the embossments between these layers can be selected differently. For example, in some preferred embodiments, the diameter of the embossments of the outer layer 101 is substantially larger than the diameter of the embossments of the inner layer 104. Among other things, employing larger diameter embossments in the outer layer 101, of the type shown in FIG. 11D further reduces the interference by the embossments. On the other hand, employer smaller diameter embossments in the inner layer 104, of the type shown in FIG. 11C can further reduce the surface area of the embossments such as to reduce friction when placing items within a pouch of the envelope, facilitating sliding of items into and out of the envelope.

In some most preferred embodiments, the inner layer 104 includes embossments of the type shown in FIG. 11C and the diameter across each hexagon 1403 is about 0.25" wide. In addition, the embossments preferably alternate between upwardly and downwardly extending (i.e., male and female embossments).

In some most preferred embodiments, the outer layer 101 includes embossments of the type shown in FIG. 11D and the inside diameter of each hexagon between the inside of the peripheral borderlines at opposite sides of the hexagons is 0.75". In addition, in the preferred embodiments, the outside diameter of each hexagon between the outside of the peripheral borderlines 0.875" (i.e., such that the width of the peripheral borderlines (i.e., the width of the embossments) is thus 0.0625". In other embodiments, the width of the peripheral borderlines (i.e., the width of the embossments) can be within a range of about 0.002' to 0.25".

As indicated above, In the most preferred embodiments of the present invention, the invention employs "expanded slit sheet" material in combination with an exterior layer of "embossed" paper to produce a padded envelope with cushioning properties. An additional benefit that the embossed paper provides, in combination with the expanded slit material, is that it provides the ability to hold the expanded slit sheet material in a stretched state (i.e., in which the expanded slit sheet paper has been expanded to open the cells and, thus, create a wider width with cushioning properties) and without creating wrinkles on the outer paper.

Notably, "expanded slit sheet" paper material not only requires a force to expand or stretch the paper, but such a paper also exerts a retraction force from a fully expanded state. In the context of this novel invention, in which an expanded slit sheet paper is preferably attached face-to-face with an outer layer of paper, the retraction force can have a tendency to cause the outer layer of paper to wrinkle due to insufficiency strength and rigidity to resist this retraction force of the fully expanded expandable slit sheet material. Additionally, as the retraction force of the expanded slit sheet paper is in a direction along the plane of the expanded slit sheet, when the expanded slit sheet is attached face-to-face with the outer layer, the retraction force will, thus, extend along the plane of the outer layer. As thin sheet material such as paper has limited rigidity along this direction, the retraction force can cause wrinkling and deformation of the outer layer.

Although heavier weight paper could be used in some embodiments to increase the rigidity sufficiently to avoid wrinkling and deformation of the outer layer (e.g., by using a heavy enough outer paper such that its rigidity imparts a greater force than the retraction force of the expanded slit sheet paper), this increased weight and stiffness of the outer layer has disadvantages. For example, the use of an outer layer with greater weight and stiffness adds to the postage costs (e.g., as postage costs are based on weight) and makes loading items within the pouch more difficult (e.g., as the flexibility of the envelope and, hence, the ability to "open" the pouch and insert items is hindered with increased rigidity of the paper, and also as heavier envelopes can be more difficult to manually manipulate in some contexts).

In some highly preferred embodiments, the expanded slit sheet paper can be formed in a novel manner to reduce the retraction force of the expanded slit sheet paper by employing a novel type of expanded slit sheet paper developed by the present inventor that involves the use of an "extensible" paper. As explained above, in the preferred embodiments, the term "extensible" as applied to paper sheets, includes a paper as set forth in the present inventor's co-pending U.S. patent application Ser. No. 16/018,702 (U.S. Application Publication No. 2018/0370702), entitled Extensible Paper and Its Use In the Production of Expanded Slit Packaging and Void Fill Products, the entire disclosure of which is incorporated herein by reference. The present inventor has discovered that an additional way of countering the wrinkling effect that the expanded slit material tends to create by the retraction forces of the expanded slit sheet material when the expanded slit tries to retract is to use extensible paper as found in the latter '702 application.

The present inventor has discovered that extensible expanded slit sheet paper requires approximately ⅓ of the total force required to stretch the expanded slit sheet material in comparison to a similar weight non-extensible paper with a similar slit pattern and. For example, an extendable slit sheet material made with Kraft paper can require a force of about 6 lbs to expand a sheet that is approximately 15.5" wide, while a extensible expandable slit sheet paper of similar weight and slit pattern can require a force of only about 2 lbs to expand a sheet that is approximately 15.5" wide. In some preferred embodiments, an extensible paper is employed for the expandable slit sheet material that requires an expansion force in the range from about 0.15 to 0.22 pounds per inch to expand the sheet. Notably, the retraction force of the expanded slit sheet from the fully expanded state correlates to this force required to expand the expandable slit sheet paper.

In some embodiments, a light weight non-embossed Kraft outer paper layer can be utilized where wrinkling is not of concern and/or where the envelope is not used for individual shipping and durability is not of as much concern. In this latter case, the envelope can, for example, be used within and as part of a consolidated shipment that requires an outer box or container (such as, e.g., a corrugated box) or for in-the-box shipping, such as, e.g., wherein the envelope is contained within another box or container along with additional items to be shipped. This type of shipment does not require a durable anti-rip layer. In the context of use of the envelopes for in-the-box shipments or the like, a lighter weigh paper can be used, such as, e.g., a 40 #or less Kraft paper for such in-the-box shipments, or, in some embodiments, even a 30 #Kraft paper for such in-the-box shipments or even less In some embodiments, the outer layer can employ an anti-rip paper, such as an anti-rip flat Kraft paper comprising a thicker paper, such as 60 #or more Kraft paper that inhibits tearing.

An additional benefit of the embossed paper in combination with the expanded slit material is the increased packaging protection that it provides. Expanded slit paper, although extremely protective as a wrap, must be placed inside an enclosure or container to provide the cushioning. The embossed paper's bulk mimics a very light duty corrugated box with a slight undulating thickness that is, thus, thicker than non-embossed paper. For example, in some illustrative embodiments, the undulating thickness due to the embossments can be approximately three times the thickness of paper without such embossments. In other embodiments, the undulating thickness can be greater than 3 times the thickness of the paper, such as, e.g., 4 times the thickness, or 5 times the thickness or even more. In preferred embodiments, the undulating nature of the embossments can operate much like the sine wave of the inner layer found within a corrugated box. Among other things, this can also help provide an initial shock protection that even further inhibits tearing that can occur with smooth (non-embossed) papers.

An additional benefit of the use of an embossed outer layer for envelope is the increased ability to manually hold the envelope by hand securely or even by conveying equipment because the embossments can add to the friction between the envelope and a user's hands or between the envelope and conveying rolls or equipment for easy handling or processing as compared to smooth (non-embossed) papers and plastic.

The accompanying figures set forth details on relation to some preferred, and non-limiting, embodiments of the inventions.

FIG. 1 is a side view of the paper cushioning or padding material 100 according to some embodiments that employs double-cross layering of expanded slit sheet materials, as found in non-provisional patent application Ser. No. 14/480,319 (U.S. Pat. No. 10,226,907), the entire disclosure of which is incorporated herein by reference. In particular, as shown in FIG. 1, in this example, two layers of expanded slit sheet papers 102 and 103 are sandwiched between an outer layer 101 of paper and an inner layer of paper 104. As illustrated by the inclined lines within regions 102 and 103, in such double-cross layering embodiments the expanded sheets have cells with walls that incline in opposing direction, such as to, e.g., help limit nesting of the two layers 102 and 103. Specifically, as shown in FIG. 1, the expanded slit paper 102 is inclined rightwardly (i.e., faces forward) and the expanded slit paper 103 is inclined leftwardly (i.e., facing backward) and are sandwiched between embossed papers 101 and 104.

Although the embodiment shown in FIG. 1 includes two layers of expanded slit sheet paper, in some embodiments three or more layers of expanded slit sheet paper are employed. However, in some of the most preferred embodiments, only a single layer of expanded slit sheet paper is employed, which single layer preferably includes layers 101 and 104 along opposite faces of the single layer of expanded slit sheet paper. In some preferred embodiments, the expanded slit sheet paper adjacent the layer 101 contacts the layer 101, and the expanded slit sheet paper adjacent the layer 104 contacts the layer 104. Alternatively, in some embodiments, one or more intermediate layer could be inserted therebetween.

FIG. 2 is a perspective view of the paper cushioning or padding material 100 shown in FIG. 1, with portions removed to facilitate reference. As shown, the layers 101 and 104 are the embossed outer paper layers (also referred to as outer layer 101 and inner layer 104 in the context of formation of an envelope by folding of the padding material 100, and the expanded slit sheet layers 102 and 103 are located between these outer layers as described above.

Although the padding material can be made in a variety of ways, FIG. 3 is a schematic side view of an illustrative and preferred pad making process wherein Kraft paper rolls 300 and 303 are fed, respectively, to idler rollers 309 and 310 and then fed, respectively, through the embossment dies pairs 301 and 304 and around idler rolls 308 making the outer layers of the padding material shown in the combining area 302 of FIG. 3. As shown, unexpanded slit material rolls 305 and 306 are fed between a pair of Velcro rolls 307 and are together stretched using respective braking mechanisms 320 and 319 that slow the unwinder to allow for stretch and continues to the combining area 302.

As discussed above, FIG. 4 is a top view of the areas of the composite of embossed and expanded slit material 400 after opposite edges 402 and 403 have been connected to form a composite structure. In some preferred embodiments, the edges 402 and 403 are laminated together between laminating pressing wheels. In the preferred embodiments, the expanded slit paper (which is not seen in FIG. 4 because it is internal (e.g., obscured by the outer layer of embossed paper) is located within the area of 401.

Additionally, in the preferred embodiments, the expanded slit sheet paper is contained within the area 401 without being adhered or affixed to the composite material 400 along the edges 402 at the lateral sides of the expanded slit sheep paper material. In particular, the expanded slit sheet material is preferably only adhered to the composite material 400 at the opposite ends of the expanded slit sheet material, and, preferably, is only adhered at the edge regions 403. In this manner, the expanded slit sheet material preferably freely extends throughout the interior area 401 in a manner to be relatively movable with respect to the outer layers 101 and 104, except at the ends of the expandable slit sheet material which are fixed within the edge regions 403 by being crushed and glued and adhered to the outer layers 101 and 104 within the edge regions 403.

Figure 5:
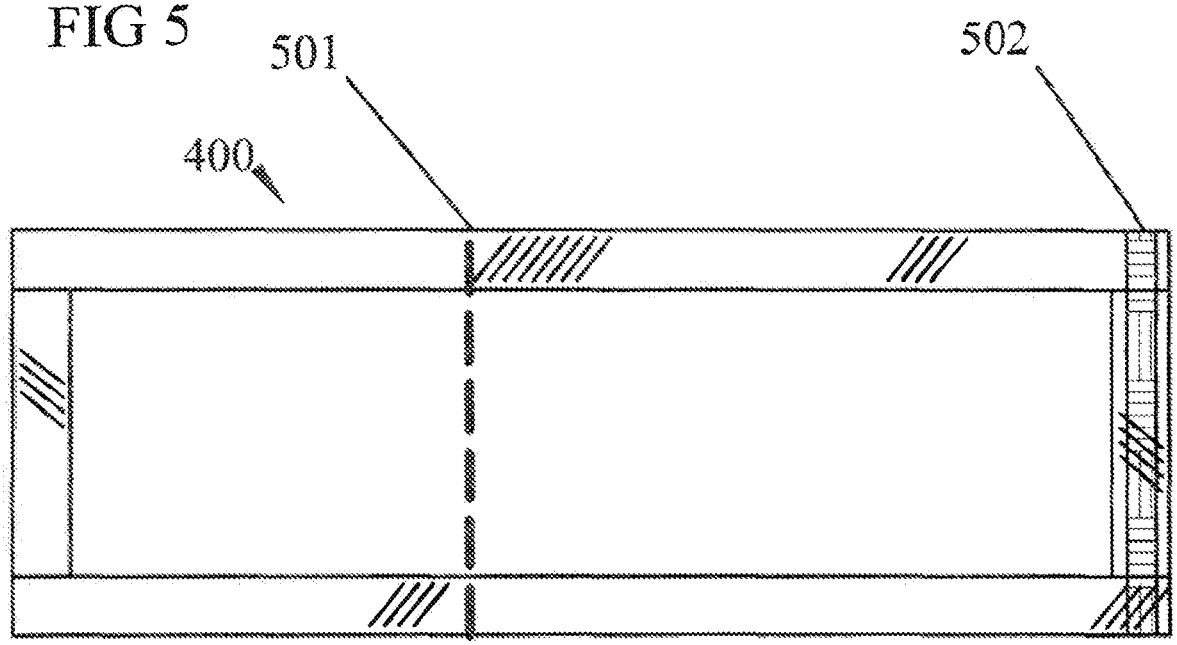
FIG. 5 is a top view of the composite material with fold lines and double-sided adhesive.

With reference to FIG. 5, FIG. 5 is a top view of the composite material 400 showing a dotted line 501 that represents a folding region for folding the material 400 to make the pouch. In the preferred embodiments, a double sided adhesive 502 is placed on the leading edge of the pad (which is to be covered by a release liner 701 as discussed below), which adhesive is later used to seal a pouch of the finally constructed envelope during use of the envelope.

With reference to FIG. 6, FIG. 6 is a top view of the padded envelope 600, after the composite material 400 shown in FIG. 5 has been folder over the folding line. As indicated above, the double sided adhesive 502 is located within the laminated edge 403 on the leading edge to provide adhesive for the envelope to close. As shown in FIG. 6, the extension portion or open area 601 is a fold-over flap portion that is folded over and adhered to the outer surface of the envelope via the adhesive 502 for closing of the envelope. In some preferred embodiments, the expanded slit sheet paper within the flap portion 601 is crushed so as to provide a thin and rigid flap to facilitate manipulation and use. However, in some embodiments, the flap portion 601 can include expanded slit sheet paper within this region in an expanded state for cushioning. For example, in some embodiments, the cushioning within the flap portion 601 can be sized so as to extend entirely over the crushed and laminated region 403 proximate the mouth of the pouch, such as to provide an extra length for cushioning the envelope over the crushed and laminated area 403 (i.e., as the region 403 is preferably crushed and laminated, the region 403 is flattened and does not have cushioning properties offered by the un-crushed expanded slit sheet paper.

Figure 8:
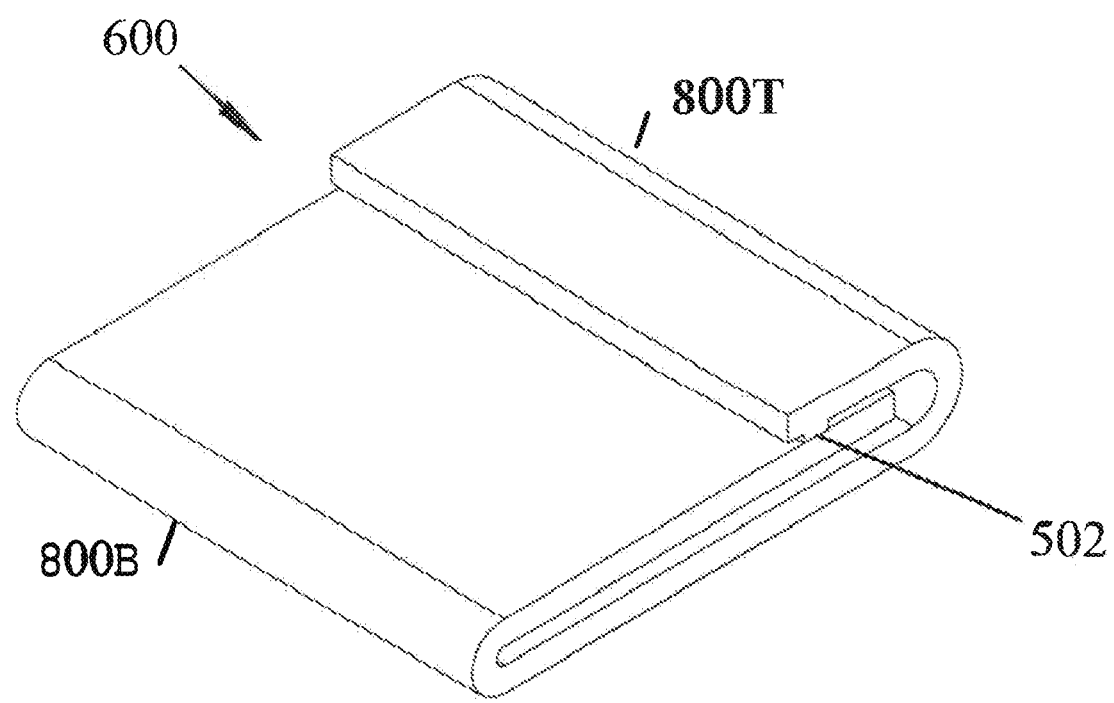
FIG. 8 is a perspective view of the composite closed envelope.

As discussed above, the double-sided tape 502 can be used to adhere the fold over flap portion to the outer surface of the envelope, and preferably the adhesive of the tape 502 adheres to the outer face of the envelope to the left side of the region 403 shown in FIG. 6 (i.e., at a side of the region opposite to the mouth of the pouch). For reference, FIG. 8 shows the envelope in a state in which the adhesive 502 is adhered to the front of the envelope just beyond the region or area 403 after the flap portion is folded over.

With reference to FIG. 7, FIG. 7 is a perspective view of the envelope 600 of FIG. 6 in the open position with double sided tape 502 is covered by a release liner 701. In FIG. 7, the edge regions 703 (i.e., which are along opposite sides of the envelope) correspond to the regions 402, which have been folded over and adhered to form the edge regions 703.

For example, the regions 402 can be folded over and crush-glued or otherwise adhered together to form the edge regions 703.

With reference to FIG. 7, the region 705 corresponds to the edge region 403 formed at the end of the extending flap portion 601 shown in FIG. 6. In some embodiments, the adhesive or adhesive tape 502 can cover an entire area of the edge region 403 or, as shown in FIG. 6, the adhesive 502 can cover a portion of the edge region 403 formed at the end of the flap portion. In the embodiment shown in FIG. 7, the edge 705 corresponds to the edge region 403 at the end of the flap portion shown in FIG. 6. However, in FIG. 7, the adhesive 502 and the release liner 701 cover the entire edge 705.

In some embodiments, in order to form the pouch of the envelope, the composite member 400 shown in FIG. 5 is folded over the fold line 501 shown in FIG. 5. In some preferred embodiments, in order to facilitate folding of the composite material at the fold line 501 in order to form the pouch, a line of glue is extended across the width along the fold line in order to glue together the expandable slit sheet material with the outer layer 101 and the inner layer 104 along a narrow line along the fold line. For example, in some embodiments a narrow bead line of glue is applied to facilitate folding at the fold line 501. In some alternative embodiments, the expanded slit sheet paper is not glued along the fold line 501, such that the expanded slit sheet material can freely move relative to the outer layers 101 and 104 proximate to the folding line 501.

In some most preferred embodiments, the expandable slit sheet material within the flap portion 601 is crushed and not within an expanded state. Notably, in the more preferred embodiments, the entire flap portion 601 can be in a compressed state. However, in some embodiments, a least some or all of the expandable slit sheet material within the flap portion 601 can be in an expanded state. For example, in some embodiments, the expanded slit sheet material can be in an expanded state within the flap portion 601 up to the edge 403 shown in FIG. 6 or, similarly, up to the edge 705 shown in FIG. 7.

In the embodiment shown in FIG. 7, the envelope includes edge areas of crush-glue adhesion at the regions 703 and the edge 705, which surround a pouch area 704. Although the regions 703 and 705 can be formed in a variety of ways, the regions are preferably formed by pressing between opposite pressing members along with gluing to retain the regions in a compressed (e.g., thin) and adhered state. For example, such regions can be formed using pressure rollers, reciprocated pressing elements and/or other mechanisms. In the preferred embodiments, a glue that is employed in areas of the crush-glue adhesion (such as, e.g., in the regions 703 and 705) hardens to provide increased rigidity and/or stiffness. For example, this can help to create a more rigid or a stiffer flap portion 601.

In some embodiments, in addition to employing glue within the regions 703 and 705, other portions of the flap portion 601 can include be glued similar to the regions 703 and 705 (e.g., to create a more rigid or a stiffer flap). However, in the most preferred embodiments, at least a region 702 (shown representatively in dashed lines in FIG. 7) which is in the vicinity of the mouth of the pouch 704 (i.e., at folding-line position of the flap portion 601) is free from adhesives or gluing.

As shown in FIG. 7, the region 700 corresponds to the region 403 shown in FIG. 6 which is formed along the edge of and delineates the mouth of the pouch. In some preferred embodiments, as shown in FIG. 7, the non-glued region 702 overlaps the side-end of the region 700, such as to extend partly within the pouch and partly outside of the pouch within the flap portion 601. In particular, by ensuring that this region is free of glue, the flap portion 601 can be more certainly and effectively folded over around a fold line within the region 702 for improved operation and functioning of the envelop. In some embodiments, in order to facilitate folding over a fold line within the region 702 a crease can be formed across the width of the region 702 which can help facilitate folding.

The present inventor has discovered that providing a glue free area 702 in the region of the fold, optimizes the folding without adversely affecting the advantageous rigidity of the flap. The unglued area 702 within the fold over area, thus, can facilitate the folding over of the closure flap. In some preferred embodiments, the non-glued area 702 preferably extends across the entire width of the envelope and preferably extends a length of less than about ½ inch in the expansion direction of the expandable slit sheet paper (i.e., a direction along the length of the envelope perpendicular to the width of the envelope), and in some more preferred embodiments, the non-glued area 702 extends less than about ⅓" in the expansion direction, and in a preferred embodiment, the non-glued region 702 extends in the expansion direction about ¼ plus or minus 15%, and, in a most preferred embodiment, preferably ¼" plus or minus 5%. In some preferred implementations, this equates approximately with the non-glued area 702 preferably being about 0.64 cm (plus or minus 15%) and, most preferably, about 0.64 cm (plus or minus 5%).

As discussed above, with reference to FIG. 7, reference number 703 indicates the glued envelope edges. Additionally, as discussed above, in some preferred embodiments, the slit sheet material is advantageously held in place only at the ends of the expandable slit sheet—and, in particular, at the top area 700 and at the region 705 which is beneath the release liner 701.

As also shown in FIG. 7, the release linear 701 which extends over and covers the adhesive 502 preferably includes at least one extension tab 708 that extends from an end of the adhesive 502 and which can be manually grasped by a user in order to pull the release liner from the adhesive 502. In the embodiment shown in FIG. 7, extension tabs 708 are shown at both ends of the release liner 701. However, in some embodiments, an extension tab 708 can be located at only one end. Additionally, in other embodiments, other mechanisms can be employed to facilitate manual removal of the release liner 701 and/or an extension tab or portion of the release liner can extend in different directions (e.g., extending towards or away from the mouth of the pouch, rather than laterally to the sides of the envelope as in the illustrated embodiment).

In some preferred embodiments, although the region 702 is free from glues or adhesives, the expanded slit sheet paper within the region 702 can be in a crushed state so as to have a smaller width so as to facilitate folding of the flap portion to close the mouth of the pouch. In some alternative embodiments, however, a portion of the flap portion 601 that extends between the distal end of the region 702 (i.e., the end of the region 702 closest to the distal end of the flap 601) and the edge region 705 includes expanded slit sheet paper in an expanded state, such that upon folding over the flap, the region 700 is covered by a cushioning created by this expanded slit sheet paper in an expanded state.

However, in some most preferred embodiments, the expandable slit sheet paper that is located within the entire flap portion 601 is in a crushed state, including the expandable slit sheet paper within the entire region 702 and within the entire region between the distal end of the region 702 and the edge region 705. In this manner, the entire flap portion 601 can, most advantageously, be more easily manipulated during use and closure of the envelope. Moreover, although the region 702 preferably is non-glued to facilitate folding of the flap portion, other portions of the flap portion can include glue such that the flap portion 601 can be advantageously more rigid and more easily manipulated during use.

As discussed above, FIG. 8 is a perspective view of a closed envelope 600 showing, e.g., double sided tape 502 affixing the envelope in a closed configuration (i.e., after removal of the release liner and closing of the pouch). In FIG. 8, the crushed sides (e.g., 703) shown in FIG. 7 are not depicted in FIG. 8 in order to help demonstrate the thickness of the pouch and the protection that the envelope provides and also to help demonstrate the bottom fold-over end 800B and the top fold over end 800T that both provide a generous internal pouch area (e.g., to help enable larger sized items to be placed within the envelope). Notably, although the lateral sides of the pouch are flanked by the crushed sides 703, as shown in FIG. 8, the bottom end 800B is preferably free from a crushed edge that would otherwise take-up or limit internal space within the pouch. Similarly, the top end 800T is preferably free from a crushed edge that would otherwise take-up or limit internal space within the pouch.

Figure 9:
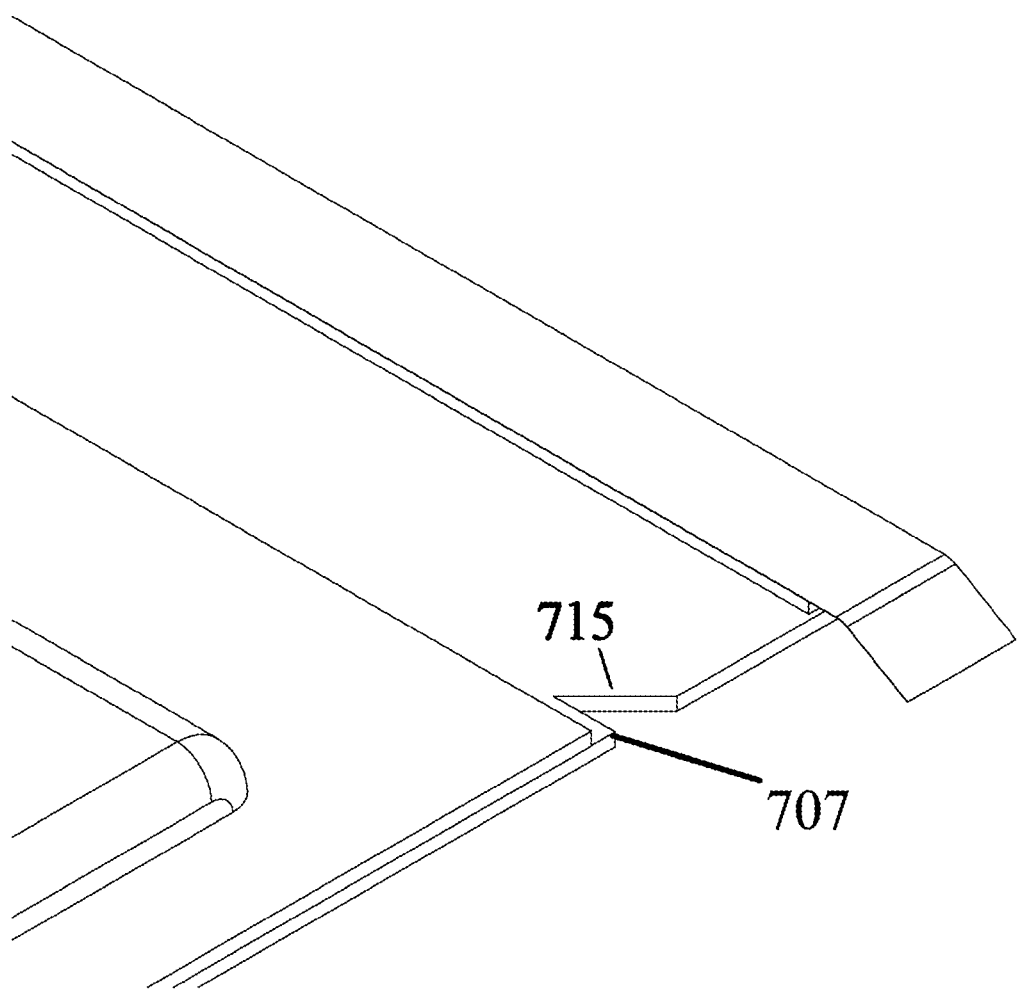
FIG. 9 is a perspective view showing a notched region for tear opening of a sealed envelope.

As shown in both FIGS. 7 and 9, in the preferred embodiments, in order to facilitate opening of a sealed envelope, the top end 800T of the envelope preferably includes a tear-open mechanism. Although a variety of tear open mechanisms can be employed in various embodiments, such as, e.g., a tear-string that is pulled laterally across the top end 800T and/or another tear-open mechanism, in some preferred embodiments, the tear open mechanism includes at least one lateral side notch 706 that is configured to facilitate manual opening or tearing of the top end 800T. As shown in FIG. 7, in the preferred embodiment, two lateral side notches 706 are provided, with a notch located at each lateral side of the envelope 600.

As shown in FIG. 9, each notch 706 is preferably located on the flap portion 601 at a base end the flap portion 601 that is aligned directly at or closely adjacent the outer end of the region 700 at the mount of the pouch. In the preferred embodiments, each notice 700 is a substantially V-shaped cut-out from a lateral side edge of the flap. IN some preferred embodiments, a base-side-edge 707 of the notch is formed so as to extend substantially parallel to the outer end of the region 700 such as to extend parallel to the mouth of the pouch in a widthwise direction across the envelope, and a front-side-edge 715 that extends forwardly at an acute angle to the base-side edge Notch 700 and back to the lateral side edge of the flap 601. In some preferred embodiments, the acute angle can be between about 20 to 50 degrees, and, in some more preferred embodiments, the acute angle is between about 25 to 45 degrees, and, in some more preferred embodiments, the acute angle is between about 30 and 40 degrees, and in some most preferred embodiments, the acute angle is about 35 degrees.

In some illustrative embodiments, the base-side-edge 707 of the notch has a length of between about ⅛ inch to about ½ inch, and, in some more preferred embodiments, a length of less than about ⅓ inch, and, in some more preferred embodiments, has a length of about ¼ inch. As best shown in FIGS. 6 and 7, in the preferred embodiments, the lateral side edges of the envelope are sealed together, such as, e.g., by being glued and pressed. As a result, the lateral side edges of the envelope, including along lateral sides of the flap portion shown in FIGS. 6 and 7 include these sealed lateral side edge portions. As a result, these lateral side edge portions can interfere with tearing or opening of the pouch. Accordingly, in the preferred embodiments, the notches 706 preferably are provided to facilitate opening of the pouch despite the sealed lateral side edges. Accordingly, in some preferred embodiments, the notch 706 is configured to extend a sufficient distance across the width of the lateral side edge to a) facilitate initiating of tearing and b) to avoid having to tear through a large extent of the lateral side edge portion. In some illustrative examples, the notch extends at least ¼ way across a width of the lateral side edge (e.g., edge 402), or in some preferred embodiments at least ⅓ way across a width of the lateral side edge, or in some preferred embodiments at least ½ way across a width of the lateral side edge, or in some preferred embodiments almost entirely or entirely across the lateral side edge portion.

In the preferred embodiments, the notch 706 is located within or adjacent the region 702. In addition, in some preferred embodiments, the region 702 include some weakening mechanism to facilitate lateral tearing of the flap from the location of the notch 706.

Figure 10:
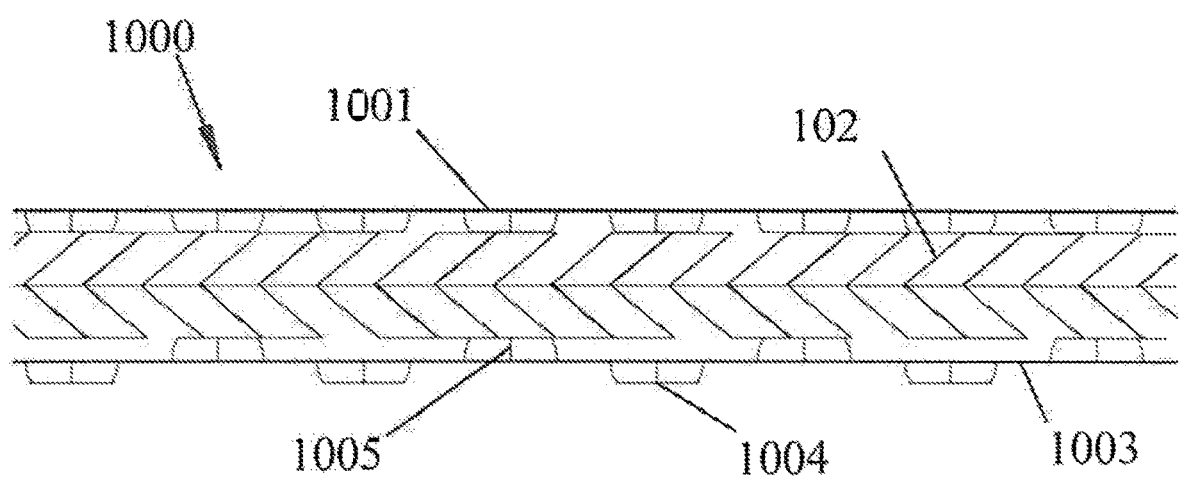
FIG. 10 is a side view of a single sided outer embossed layer of Kraft, a double layer of expanded paper and an inner layer of raised and recessed embossed paper.

With reference to FIG. 10, FIG. 10 shows other illustrative embodiments of a composite material for forming an envelope. As explained above, in various embodiments, inner and outer layers of a composite material for forming an envelope can include a variety of different embossment structures. In the illustrative example shown in FIG. 10, the outer layer 1001 is provided with a pattern or array of downwardly extending embossments. As indicated above, in some preferred embodiments, these downwardly facing embossments help to achieve a substantially even outer surface that can, e.g., facilitate placement or adhesion of a label (e.g., a shipping label) to an exterior of the envelope. Notably, this embodiment is similar to the embodiment described above with respect to FIG. 11D.

Additionally, in FIG. 10 the inner layer 1003 in this embodiment can include a plurality of upwardly facing embossments 1005 and downwardly facing embossments 1004. Notably, this embodiment is similar to the embodiment described above with respect to FIG. 11C. Among other things, this embodiment can help to increase strength and rigidity and can also help to reduce or inhibit friction applied to items as they are inserted into or remove from the pouch (as described above). Additionally, this inner layer 1003, thus, provides a layer with two-sided embossments. Among other things, this provides a thick embossed layer made from a thin, flat, paper sheet, and, therefore, also advantageously provides additional cushioning.

Figure 12:
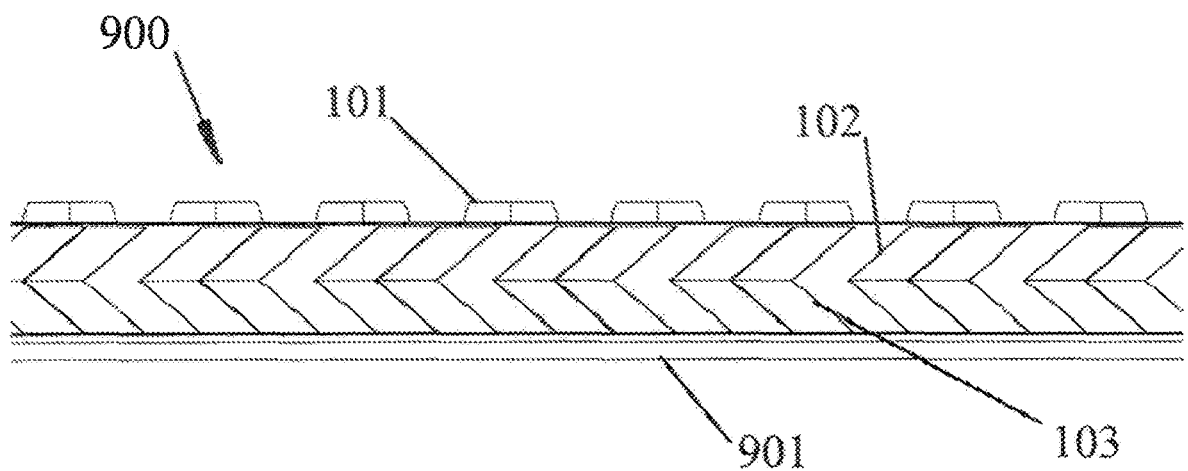
FIG. 12 is a side view of a single sided embossed layer, a layer of flat Kraft paper and a double layer of expanded paper between the embossed and flat layers.

With reference to FIG. 12, FIG. 12 illustrates another illustrative embodiment of a composite material 900 for forming an envelope. In this illustrative embodiment, the outer layer includes a pattern of upwardly extending embossments 101. Moreover, in this embodiment the inner layer 901 is a smooth non-embossed layer. Among other things, providing a non-embossed or smooth inner layer can facilitate in some circumstances with insertion and removal of items to or from the pouch of the envelope.

Figure 13:
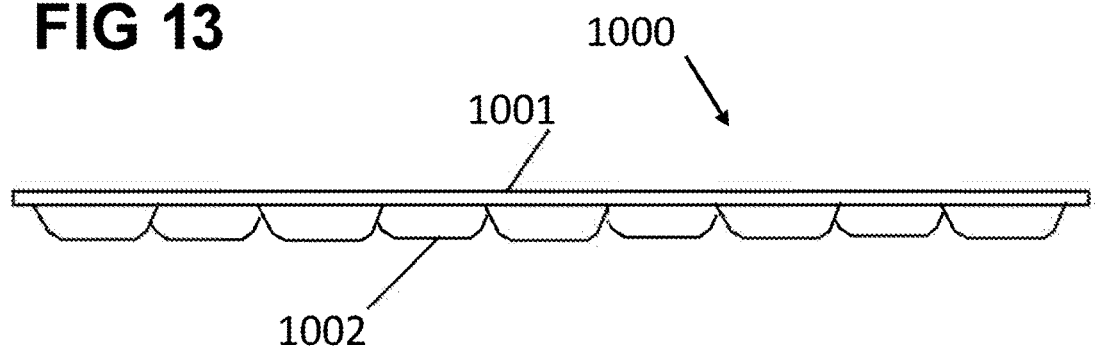
FIG. 13 is a side view of an embossed sheet.
Figure 14:
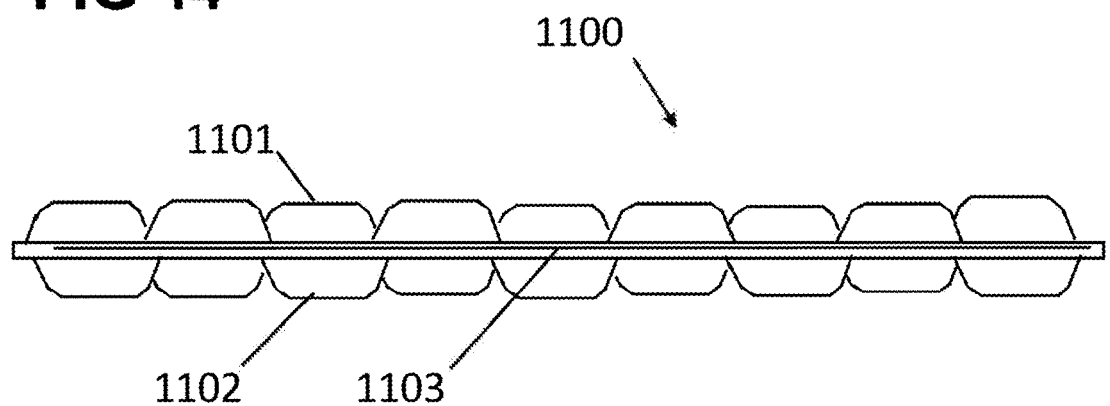
FIG. 14 is a side view of a two sided embossed paper as a cushioning inner layer.
Figure 15:
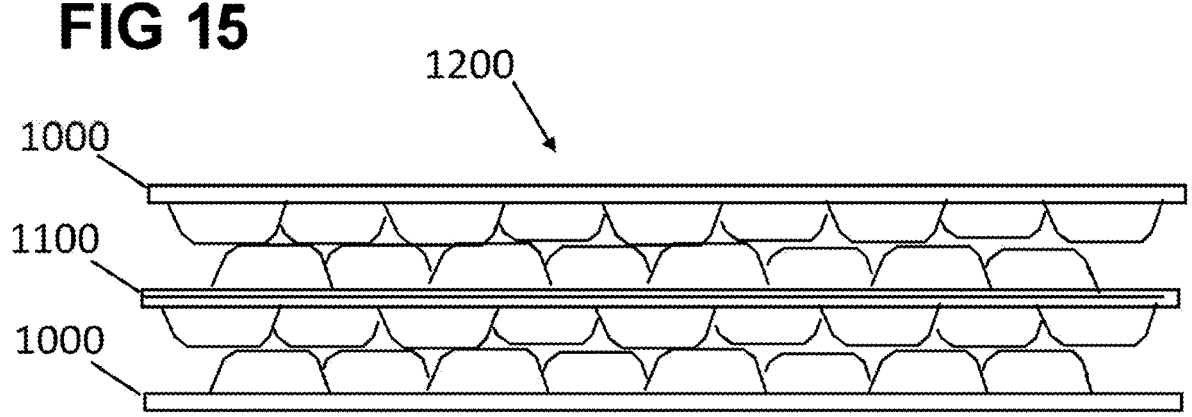
FIG. 15 is a side view of the double sided embossed layer of FIG. 14 in combination with an inner and outer layer of single sided embossed Kraft paper.

With reference to FIGS. 13-15, these figures illustrate another illustrative embodiment of a composite material 1200 (shown in FIG. 15) for forming an envelope according to some illustrative embodiments. In the illustrative embodiments shown in these figures, rather than employing an expandable slit sheet material (such as, e.g., instead of using one or more layers of expandable slit sheet material, such as, e.g., layers 102 and/or 103 as shown in FIG. 1) that is placed between outer layers, the embodiment shown in FIGS. 13-15 employ a novel embossed cushioning layer between two outer layers. Although a specific arrangement of embossed layers is shown in FIG. 15, with an outer layer 1000 having downwardly extending embossments, and inner layer 1000 having upwardly extending embossments, and a middle layer with embossments extending both upwardly and downwardly (such as, e.g., to act as a cushioning layer), it should be appreciated that the outer layer 1000 and the inner layer 1000 of this embodiment can be modified similar to other embodiments described herein. Similarly, the inner layer 1100 can be modified to include other embossment patterns according to other embodiments described herein.

In this illustrative embodiment, FIG. 13 shows an illustrative embossed paper sheet 1001 having a pattern of embossments 1002 (such as, e.g., an array of circular, polygonal and/or other shaped embossments), extending therefrom in a single direction. As shown in FIG. 15, in this illustrative embodiment, the layer 1000 can be employed to form both the outer layer and the inner layer. By way of example, in some preferred embodiments, a similar layer 1000 can be arranged as an outer layer with the embossments facing downwardly, and a similar layer 1000 can be arranged as an inner layer with the embossments facing upwardly. As illustrated in FIG. 15, in the preferred embodiments in which embossments also provide a cushioning function, the embossments of the outer layer 1000 are distributed in such a manner such that when the layer 1000 is employed as an outer layer with downwardly facing embossments, the peaks of at least some of the embossments will contact the peak of at least some of the upwardly extending embossments of the middle layer such as to maximize thickness. Similarly, the embossments of the outer layer 1000 are distributed in such a manner such that when the layer 1000 is employed as an inner layer with upwardly facing embossments, the peaks of at least some of the embossments will contact the peak of at least some of the downwardly extending embossments of the middle layer such as to maximize thickness.

As shown in FIG. 14, in the preferred embodiments, at least one layer is employed that an undulating two-sided pattern layer 1100 which increases the final thickness of the embossed sheet.

In various embodiments described herein, the embossments can have depths of varying degrees depending on circumstance. In some embodiments, embossments can vary in overall thickness between about 0.01 and 0.19 inches. Among other potential advantages, the embossments can provide flexibility for ease of loading the items into an envelope for shipping and the varying thicknesses of cushioning layers provide additional cushioning protection.

In various other embodiments of the invention, other types of paper cushioning materials can be employed in combination with the outer embossed paper. Although these paper cushioning materials may provide less cushioning than a slit sheet layer, some embodiments can still employ such other paper cushioning materials. For example, such other embodiments can be desirable if a thinner product is desired and/or if less cushioning is required. The resultant thinner envelope reduces the cost for shipping by being able to place more envelopes within the same size container. The thinner composite design can provide an anti-tear design where no cushioning in required. These environmentally friendly, all-paper envelopes and pads, can replace plastic envelopes that by way of comparison provide little or no cushioning. Below are examples of other paper cushioning materials that can be employed in some illustrative examples.

Figure 16:
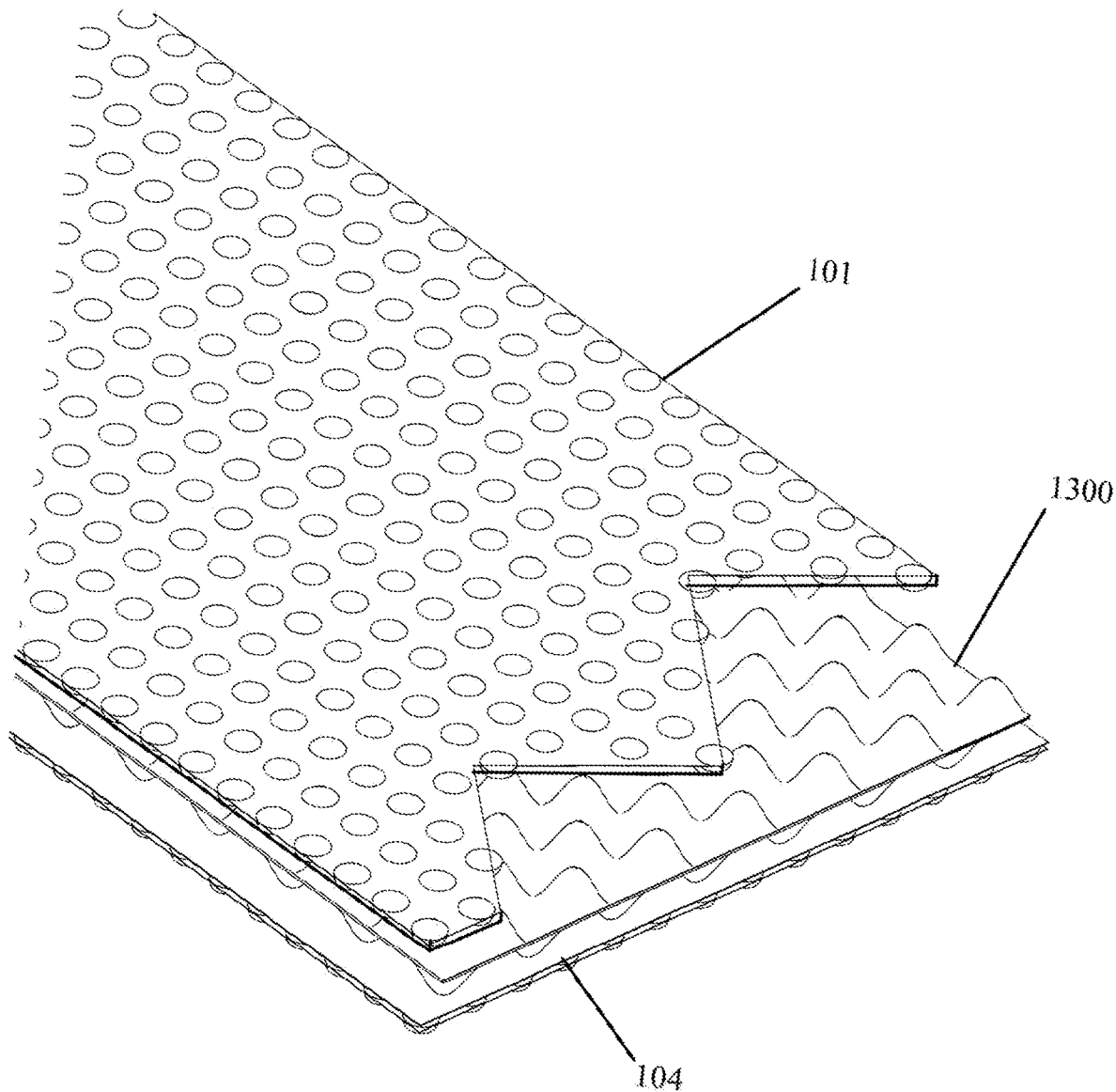
FIG. 16 is a perspective view of the combination of FIG. 15.

With respect to FIG. 16, FIG. 16 shows an embodiment that includes an outer layer 101 having an array of downwardly facing circular embossments, and an inner layer 104 that also includes an array of downwardly facing embossments. In this illustrative embodiment, an intermediate paper layer 1300 can be provided that includes an undulating sheet of paper. In this manner, the interior paper can operate to provide an cushioning quality similar to that employed in other embodiments described above.

Figure 17:
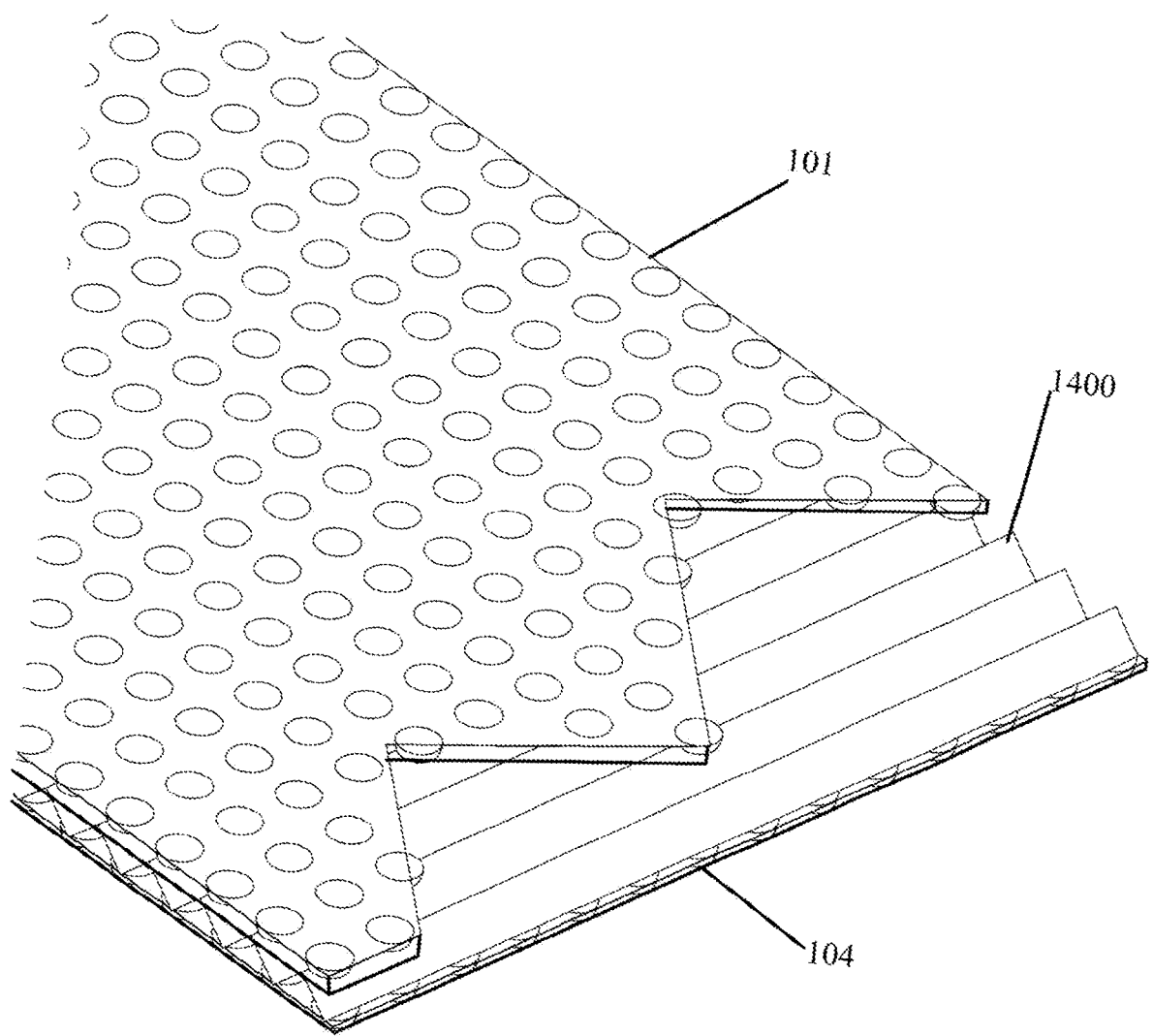
FIG. 17 is a perspective view of a fan fold cushioning layer in combination with embossed layers.

With respect to FIG. 17, FIG. 17 shows an embodiment that includes an outer layer 101 similar to that shown in FIG. 16, as well as an inner layer 104 that is similar to the inner layer 104 shown in FIG. 16. However, the embodiment shown in FIG. 17 employs an intermediate paper layer 1400 that is a pleated layer. In various embodiments, the cushioning that is provided by such a pleated paper varies based on the thickness of the pleated layer, as well as the pleat leg length and heights of the pleats, and the angles of the pleats. In some implementations, this can provide less flexibility where thinner items are to be packed and are not fragile. As shown in FIG. 17, the pleated layer 1400 is tall with an apex angle of approximately 90 degrees. In various embodiments, the pleat height can be reduced by increasing the apex angle in the range of 105-165 degrees thus increasing cushioning and flexibility, as desired. In embodiments employing a composite material similar to that of this embodiment, an envelope could be configured that is somewhat flexible in the long direction and firmer in the direction of the envelope opening. In some illustrative embodiments, the pleated embodiment diverges from the prior art of pleated paper packaging found in U.S. Pat. No. 6,871,480, and U.S. Publication Nos. 2014/016666A1 and 2009/0233023A1, which are all incorporated herein by references as if recited in full.

U.S. Pat. No. 6,871,480 teaches the use of tissue paper adhered to the apices of the pleated sheet with a steep angle for stiffness as a wrapping product that is significantly taller to create a cushioning barrier. On the other hand, in some preferred embodiments of the present invention, wider pleat angles than taught in U.S. Pat. No. 6,871,480 are preferably employ, and preferably it is laminated only around the edges to the embossed paper.

Figure 18:
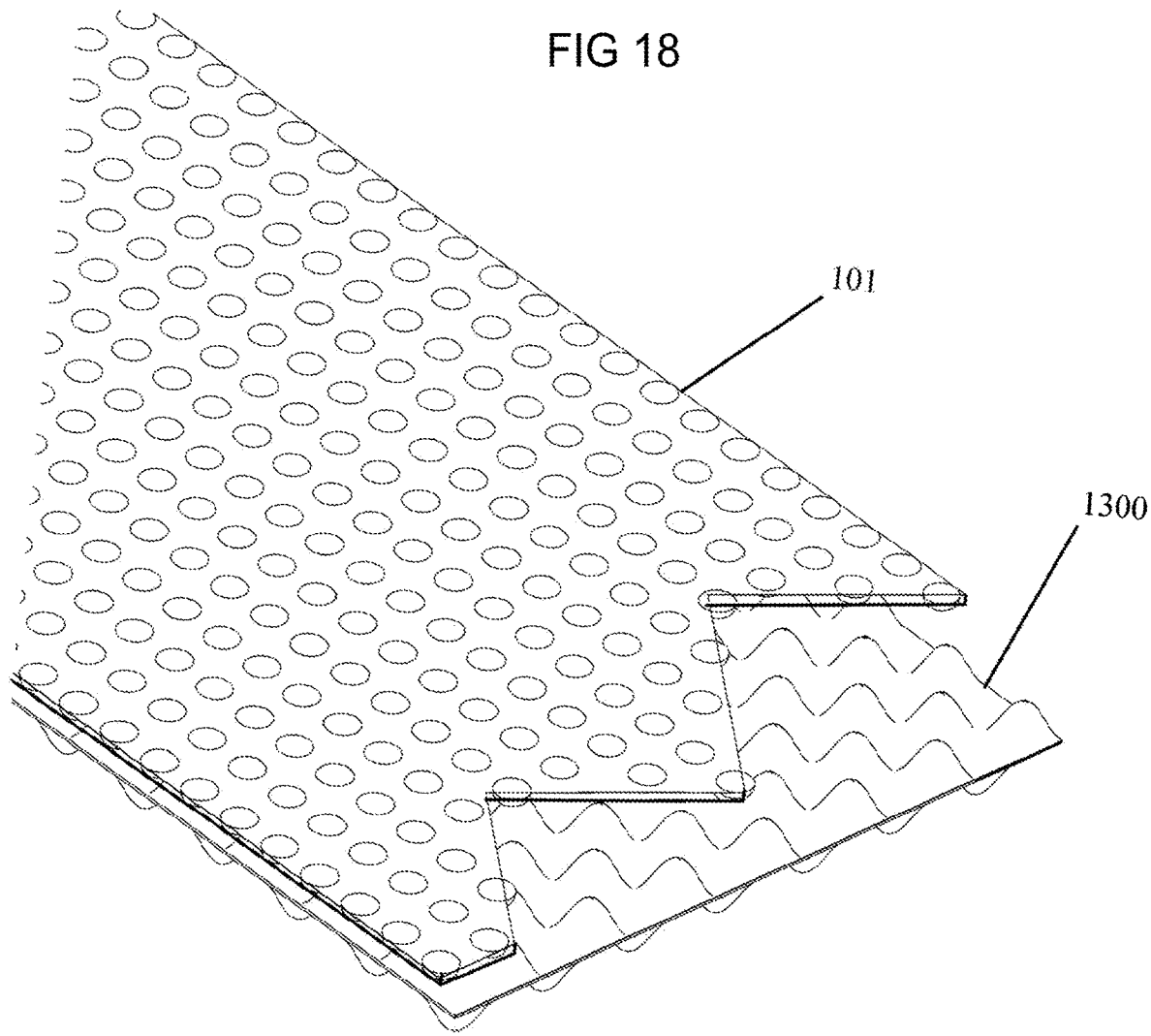
FIG. 18 is a perspective view of an undulating two-sided pattern in combination with an embossed layer.

With respect to FIG. 18, FIG. 18 shows an embodiment that is generally similar to that shown in FIG. 16, but without the inner layer 104. In particular, the embodiment shown in FIG. 18 includes an outer layer 101 having an array of downwardly facing circular embossments and an intermediate paper layer 1300 that includes an undulating sheet of paper similar to that shown in FIG. 16. In some embodiments, an inner layer can be provided of any particular type as described in the present application. In some other embodiments, a similar combination of the outer layer 101 and intermediate layer 1300 shown in FIG. 18 can be placed facing upwardly beneath the layers shown in FIG. 18 to create a composite material according to some other embodiments that includes two intermediate undulating paper layers.

With reference to FIGS. 19-22, various exemplary methods and techniques for manufacturing envelopes according to various embodiments of the invention are depicted in these figures.

In some of the preferred embodiments, the envelopes are preferably manufactured by conveying rolls of material so as to create a composite of aligned layers that are conveyed parallel to and alongside one another, such as, for example, as shown in FIG. 3, in which the composite of aligned layers is shown at 302. The various embodiments described herein can all include conveying devices similar to that shown in FIG. 3 to convey an elongated composite of aligned layers, and, such layers can then be processed to create a plurality of envelopes, such as, e.g., by connecting together portions of the layers (such as, e.g., at edge regions 402, 203). In some preferred embodiments, a plurality of composite materials (similar to 400 shown in FIG. 4, for example) for forming envelopes are formed in an end-to-end relationship, such as, e.g., shown in FIG. 19. Then, after formation, the formed composite materials can be cut from the conveyed end-to-end conveyed materials, to as to form separated individual composite materials similar to 400 shown in FIG. 4, for example. Then, the composite materials can be folded over and glued to form enclosed envelopes, such as shown in FIGS. 5-6, for example.

Figure 19:
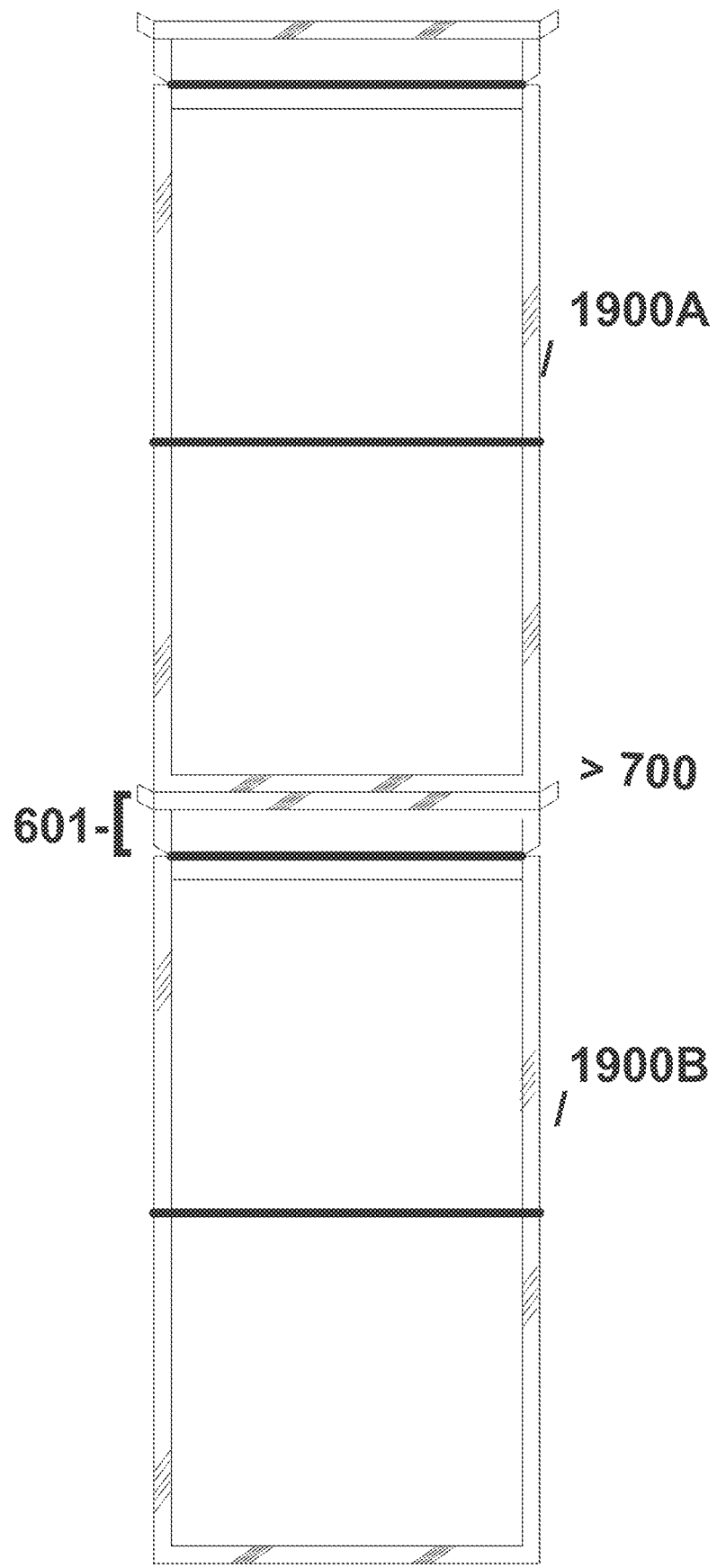
FIG. 19 is a plan view of two consecutive envelope pads that have been crushed in fold areas and die-cut in envelope end crush areas while, simultaneously being maintained under tension in the manufacturing direction in the side-crushing areas.

As shown in FIG. 19, in the preferred embodiment, the conveyed composite of aligned layers includes a plurality of composite materials (corresponding to a plurality envelopes) connected together in an end-to-end manner. For example, FIG. 19 shows two composite material portions 1900A and 1900B connected together in a repeated pattern, wherein, the composite materials shown in FIG. 19 are configured such as to be used form envelopes of the type shown in FIG. 7.

As illustrated in FIG. 19, in this illustrated embodiment, the region 700 formed at the bottom end of composite material portion 1900A (which is later folded over to form an outer edge of the mouth of a pouch as shown in FIG. 7) is in a state in which it is connected to a distal end of a flap portion 601 of the composite material portion 19006.

In this illustrated example, the portions 1900A and 1900B are also depicted with release liners 701 attached to the portions 1900A and 1900B. Although in some embodiments, adhesive 502 can be placed at region 705 and the release liner 701 can be placed over the adhesive prior to separation of portions 1900A and 1900B, in some alternative embodiments, such adhesive 502 and release liners 701 could be added to individual portions 1900A and 19006 after separation.

In some illustrative embodiments, the flap portion 601 is approximately 1.5" long (i.e., in a lengthwise direction of the portions 1900A/B) and the edge region 700 is approximately 0.5" long (i.e., in a lengthwise direction of the portions 1900A/B).

In some preferred embodiments, in order to a) adhere together layers of composite materials, b) crush the expanded slit sheet paper within the combined layers of composite materials (or to crush other cushioning papers, such as, e.g., pleated papers, embossed papers, or the like, that are within the combined layers of composite materials in some embodiments), and c) separate the composite material portions 1900A/B, various conveying rollers are employed.

Figure 20:
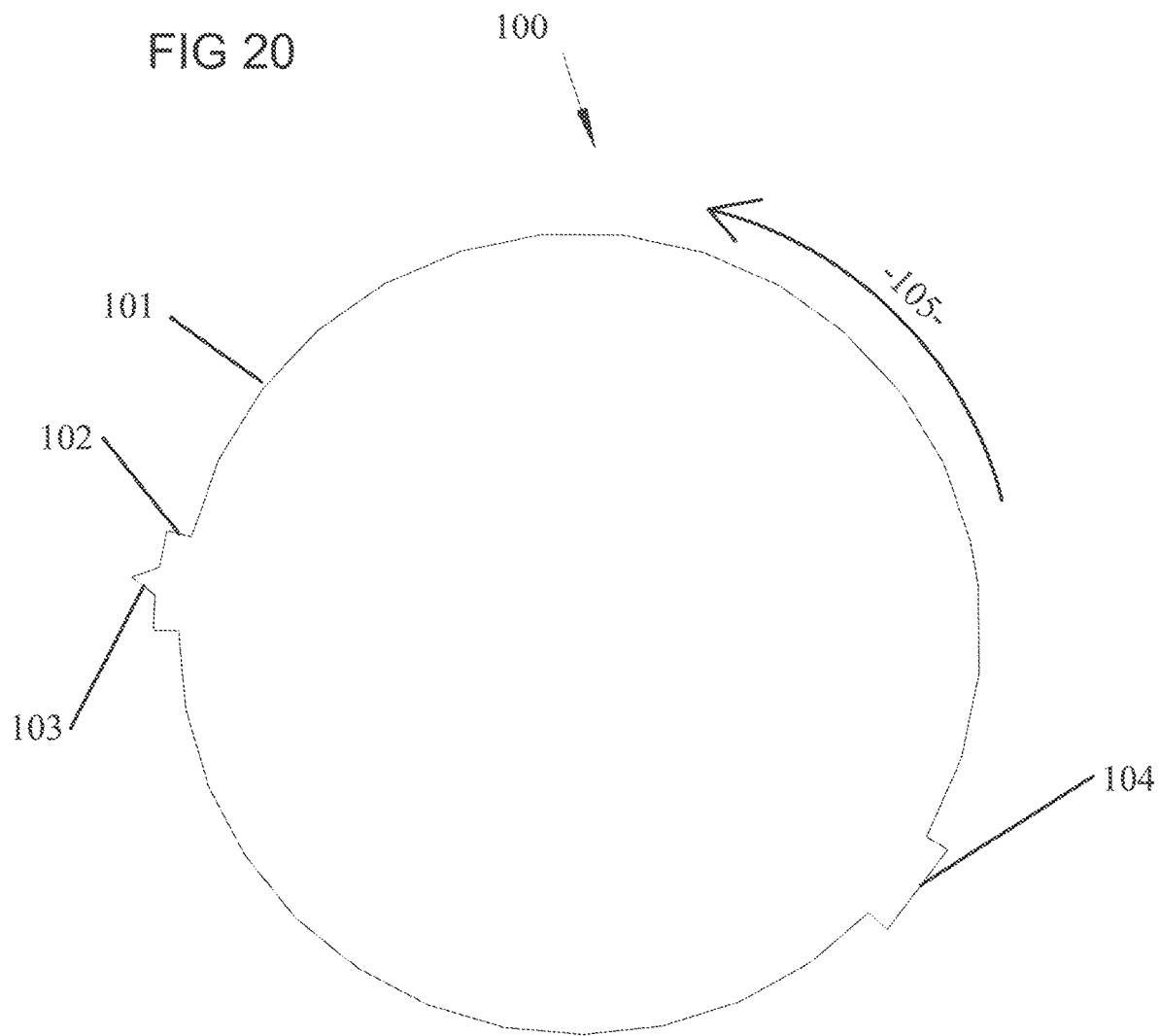
FIG. 20 is a side view of the upper rotary tool that provides the crush and cut for making the padded envelope.
Figure 21:
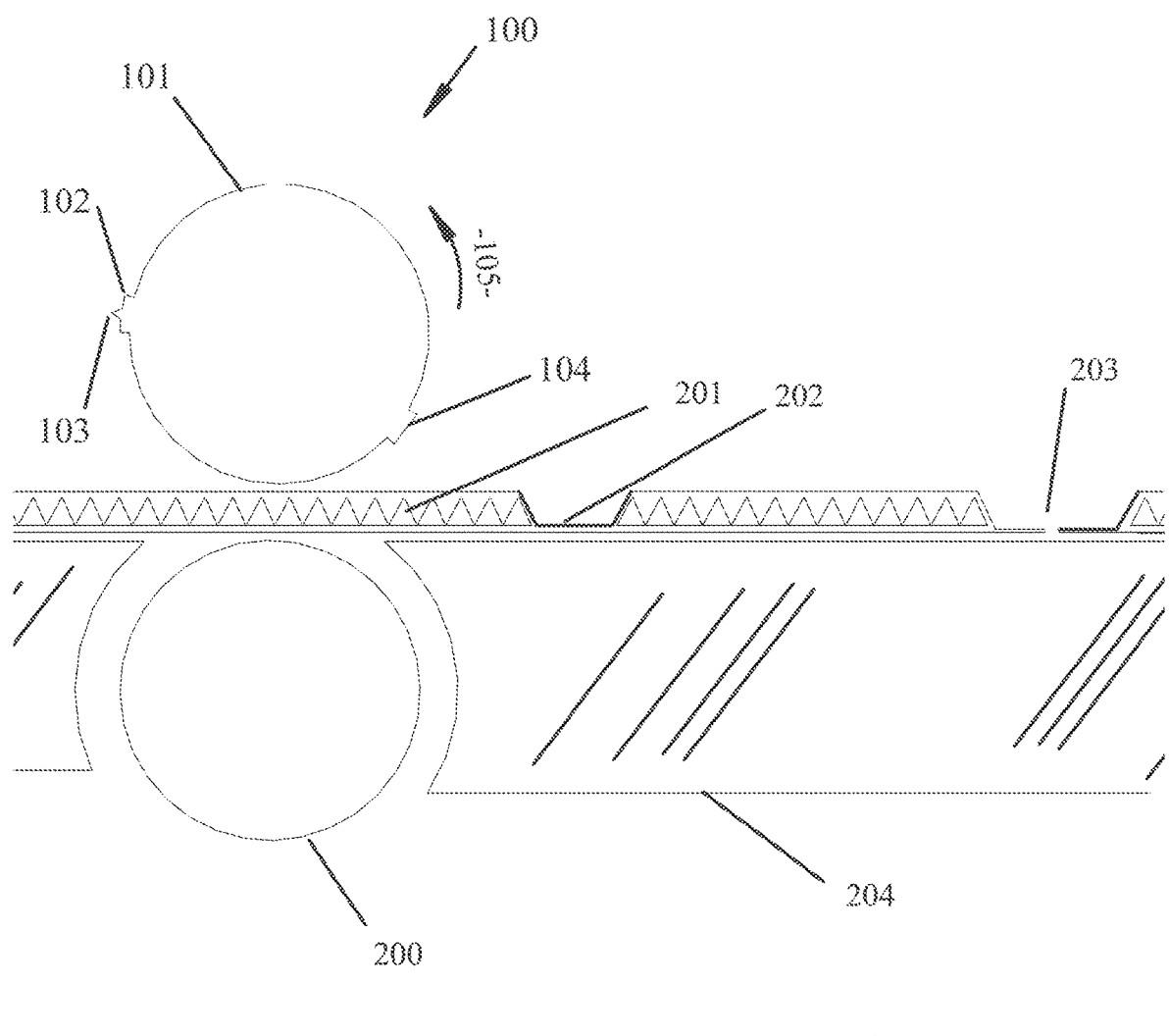
FIG. 21 is a side view of the die cut crush rotary system.

For example, FIG. 20 shows an illustrative conveying roller 100 that can be employed in some embodiments. In this illustrative example, the conveying roller is rotated in a direction counterclockwise as shown by the arrow 105 in FIG. 20. As shown in FIG. 21, the roller 100 cooperates with an opposing roller 200 and together rotate as the composite material layers are conveyed in the direction of the arrow 205 between the rollers 100/200 via the conveyor system. In the preferred embodiments, the roller 100 rotates in the direction of the arrow 105 at a same rate of the movement in the direction 205.

In the preferred embodiments, the roller 100 operates as a die cutting-crushing rotary tool where 101 is the outer circumference of the tool and is specifically sized to have a circumference that is the same as the total length of the envelope pad being made.

As shown in FIGS. 20 and 21, the roller 100 includes a depending pressure member 104 which is configured to cause the composite materials to become crushed in a region 202 as shown in FIG. 21 (e.g., by being pressed between the rolls 100 and 200 when the portion 104 is adjacent the roll 200). In addition, the roller 100 also includes a depending pressure member 102 that includes a cutting member 103 (e.g., a cutting blade or the like) which is configured to cause the composite materials to become crushed in a region 203 and also cut or separated in the region 203 (e.g., by being pressed between the rolls 100 and 200 when the portion 102 is adjacent the roll 200, and by being cut by the cutting member 103).

Figure 22:
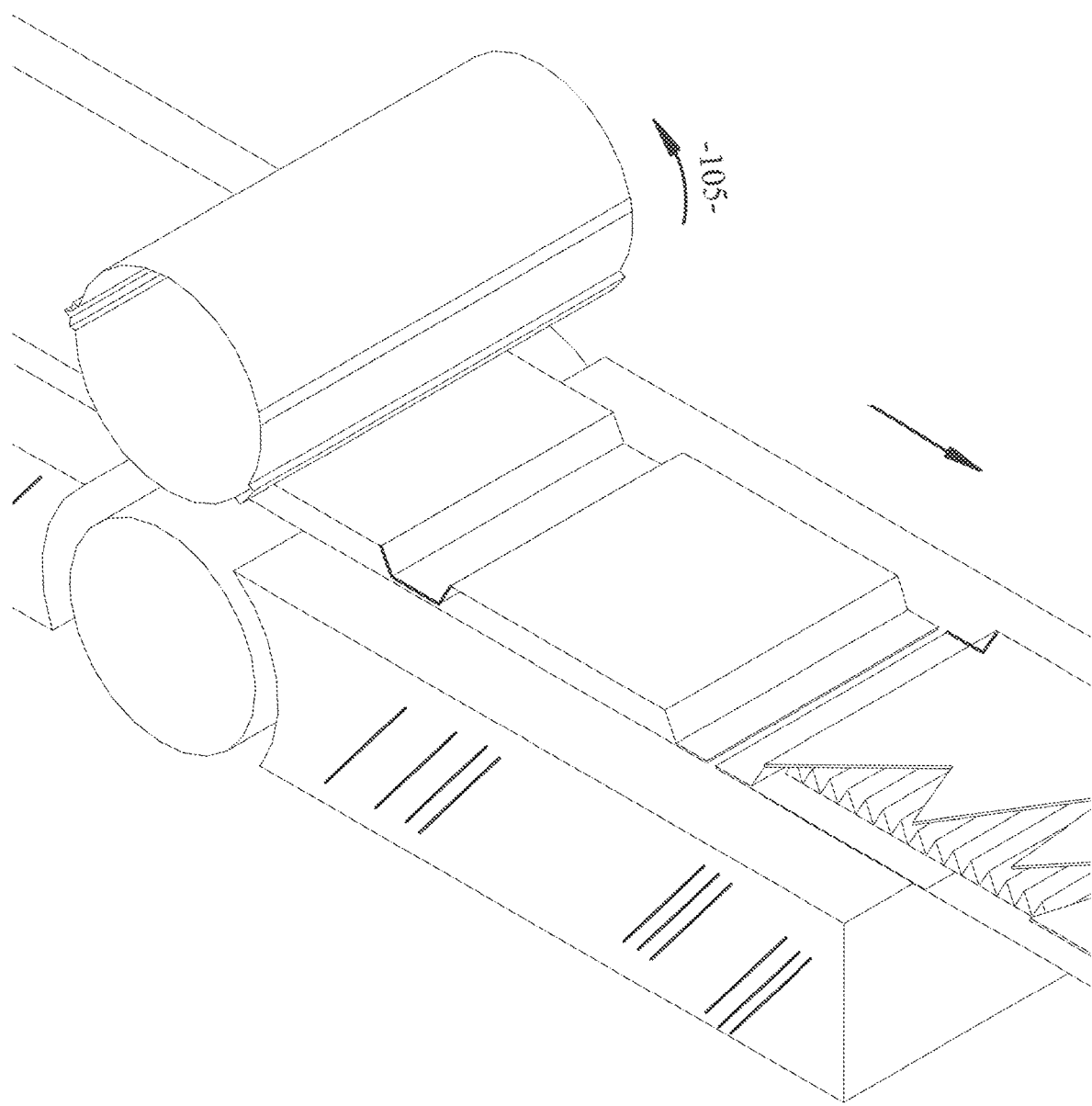
FIG. 22 is a perspective view of the rotary padded envelope pad making section.

For reference, FIG. 22 shows a perspective view of the system shown in FIG. 21. Although FIGS. 21 and 22 schematically show at 201 an expanded paper that appears as a pleated paper, in the preferred embodiments, the element 201 is an expanded slit sheet paper in accordance with the most preferred embodiments of the invention. However, as should be appreciated based on this disclosure, in some less preferred embodiments, a pleated paper could be employed similar to the embodiment shown in FIG. 17 or any other cushioning layer described in other embodiments herein could be employed as an interior cushioning layer 201 of FIG. 21.

With reference to FIGS. 20-22, it is noted that these figures are schematic representations and some of the sizes or the like of the components are not to scale for the formation of some of the embodiments of the invention.

With reference to FIG. 21, in some preferred embodiments, the crushed region 202 which can be formed by the member 104 can be employed to create a narrow crushed region to facilitate folding to create an envelope pouch in some preferred embodiments. For example, this can be employed along the fold line 501 in the embodiment shown in FIG. 5 or to create a narrow crushed region at a location of the fold 709 shown in the embodiment of FIG. 7. In this manner, the composite material can be more readily folded over the fold line 501 or at the fold 709. Although FIG. 21 schematically shows a wide crushed portion, in some preferred embodiments, the width of the crushed region in a lengthwise direction (e.g., in the machine direction) is preferably less than ½ inch, or, in some embodiments, less than ⅓ inch, or, in some embodiments, less than ¼ inch, or, in some embodiments about ⅛ inch or even less.

In some preferred embodiments, prior to reaching the rollers 100 and 200, the composite materials pass a device that applies glue at regions to be glued during pressing of the rollers 100 and 200. For example, prior to pressing to create the crushed region 202, in the preferred embodiments, a narrow strip of glue is already applied by the glue device. In the preferred embodiments, the narrow strip of glue has a width in the length direction that is the same or less than the width of the crushed region in the lengthwise direction as discussed above.

With reference to FIG. 21, in some embodiments the region 203 represents a region in between adjacent portions for creating separate envelopes, such as, e.g., between adjacent portions 1900A and 1900B shown in the embodiment of FIG. 19. In addition, the crushed portion shown to the right of the cut in the region 203 in FIG. 21 (which cut having been made by the cutter) can correspond to, e.g., the portion 700 in the embodiment shown in FIG. 19 (as one illustrative example), while the crushed portion shown to the left of the cut in the region 203 in FIG. 21 can correspond to, e.g., the flap portion 601 shown in FIG. 19 (as one illustrative example).

As such, it should be appreciated that in some illustrative embodiments, the rollers 100 and 200 can be used to join together the layers by forming widthwise crushed and glued portions and separating the joined composite material portions for forming of individual separate envelopes.

Although not illustrated in FIGS. 20-22, in the preferred embodiments, after the layers are conveyed into the combining area 302 shown in FIG. 3 and before the layers are conveyed to the rollers 100 and 200, the composite layers are preferably directed to a glue device that applies glue to appropriate locations in between the composite layers at appropriate locations along the layers. In some embodiments, the glue device includes one or more glue dispensing nozzles that are computer controlled to dispense glue at precise locations between the layers. In some examples, the glue device can, for example, apply glue to one layer, such as, e.g., a bottom layer at a location in between the composite layers. Then, later, upon application of pressure (such as, e.g., between the rollers 100 and 200) the applied glue can permeate and adhere between all of the layers in some embodiments.

Additionally, although also not shown in the figures, concurrently with application of the glue by the glue device or after application of the glue but prior to conveyance to the rollers 100 and 200, in some preferred embodiments, the lateral side edges of the composite layers are preferably adhered together by applying pressure rollers along both lateral side edges of the composite layers, such as to form, for example, connected regions 402 shown in the illustrative example of FIG. 4. In order to adhere the lateral side edges, it should be appreciated that the glue device should also preferably apply glue at appropriate lateral side edges to enable formation of the edge regions 402 or the like.

In this manner, prior to connecting together of the composite layers cross-wise across a width of the layers (i.e., transverse to the machine direction), the composite layers are preferably initially attached along their lateral edges to form a generally tubular configuration prior to passing between the rollers 100 and 200.

In the schematic representations shown in FIGS. 21 and 22, the lateral side edges of the composite layers are not illustrated as adhered together. However, in the preferred embodiments, as discussed above, the lateral side edges are adhered prior to passing through the rollers 100 and 200.

Although FIG. 19 shows notch regions already formed along the flap region 601, in the preferred embodiments, notch regions (such as, e.g., notches 706 shown in FIG. 7) are concurrently formed by the rollers 100 and 200, in such a manner that in addition to incorporating a cutting element 103 to separate adjacent portions, the roller 100 can include additional cutting elements to form similar notches 706.

Additionally, although not depicted in FIGS. 20-22, in addition to a cutting element 103 the member 102 can also include a pressing element that does not cut through the composite material, but that creates a score line extending between the notches 706 in order to facilitate tearing for opening of the pouch after being sealed closed.

Accordingly, in the illustrated embodiments, attached to the outer circumference of the roller 100 is crush area member 102 in combination with cutting element 103 and score line crushing area member 104 that creates a fold region for the pouch area of the envelope as the roller 100 rotates in direction of arrow 105. The die cutting-crushing areas 102 and 103 make contact with the envelope pad layers are which are crushed and cut at 203. Continuing the rotation crush only area 104 had just crushed in area 202 and the repeat of the crushing would make an additional crush cut 203 to continuously make envelope pads.

Additional Noteworthy Aspects of Some Preferred Embodiments

As discussed herein-above, in the preferred embodiments, an embossed paper is employed which provides a flexibility and a slight cushioning protection not found in flat sheet paper.

In some preferred embodiments, the expanded slit material is not adhered to the sides (e.g., not adhered to regions 402 shown in FIG. 4, regions 705 shown in FIG. 7, etc.), but, advantageously, only or substantially only to the front and back areas. Among other things, this advantageously provides for much smaller use of adhesive and produces a superior and much more sustainable padded envelope.

In some preferred embodiments, the present invention employs expanded slit sheet material in combination with top and bottom exterior layers of paper to produce a padded envelope with cushioning properties. To provide this on a continuous basis with consistent optimal stretching of the slit sheet material a rotary method of die cutting and crushing is preferred.

In some preferred embodiments, a padded envelope is provided in which the mouth opening of the padded envelope is across the width of the machine. On the other hand, in existing systems, manufacture a mouth is transverse to the direction of the preferred embodiments herein. In existing systems for making envelopes, there is no concern to deal with a simultaneous stretching of a slit paper (since such paper has not previously been employed), and, therefore, existing systems orient envelopes such that more envelopes can be made per minute. In addition, for existing systems, laminating is done with heat for plastic bubble and, therefore, is instantaneous unlike the requirement for drying of a paper cold glue or a cooling of a paper hot melt glue. It is typical that the length of the envelope is wider that the mouth or envelope width. By way of example, if the bubble padded envelope is 10" wide by 20" long then, each guillotine cut happens every 10" versus every 20" and therefore doubles the padded envelope making speed.

An issue with a guillotine making system is that it separates the leading envelope from the prior envelope and places a higher burden on maintaining the stretch of the slit sheet material in a smaller number of glued square inch area of the immediate envelope.

During the manufacturing process where the glue is in the process of drying and/or cooling, it is, therefore, more vulnerable from distortion and delamination from the retracting slit sheet material. To overcome this, the rotary method is the best way to maintain the maximum amount of paper adhesive combination. If the instant process used a guillotine, then the web would slacken during the cutting process, thus, producing wrinkling and delamination.

There is an additional reason for the rotary method required for slit sheet material. The expanded slit sheet is most conveniently stretched in the direction of manufacture. Since most padded envelopes are longer than they are wide, manufacturing in the width direction would cause either one of two scenarios:

The first, is the expanding the slit sheet in the direction of manufacture and would in many instances require multiple webs of material being stretched which, would require more than one slit sheet die cutter and the handling and exact position of the multiple side-by-side webs required. The maximum available width of a die cutting machine is 30" which makes the stretched width of 23.5". The envelope still requires folding for the pouch and the fold over seal of about 1.5" making the usable pouch area 11". Many envelopes are longer that 11" for the pouch area. Again, the solution would be multiple die cutters to manage the full length required and the complications of placing them side by side.

The second is by expanding in the transverse direction of manufacture which would require one web but, would require a holding mechanism to maintain stretch while gluing the multiple layers in a step-by-step basis rather than a continuous manufacturing process.

Either approach creates a further issue of cost of machinery. On the other hand, the present machine is small in footprint and can be placed close to markets that would be too small for width direction equipment.

In some preferred embodiments, in order to be able to adhere a label to an outer surface (such as, e.g., a shipping label), an envelope outer layer is embossed very lightly, and preferably with narrow embossments, and with embossments that do not protrude outwardly. And, at the same time, an envelope inner layer can preferably be embossed more heavily (e.g., on an inside surface of the envelope).

Customers often consider the weight of the envelope to be an important aspect as, e.g., customers desire to save money on postage. Paper having outer layer-expanded layer-inner layer weights that are each below, e.g., 50 pounds or each below 45 pounds, or, e.g., about 43-43-43 pounds, or, e.g., about 40-40-40 pounds as envelope weights, can employ aspects of preferred embodiments described herein and employ embossing (e.g., an inner embossing) along with an extensible slit sheet paper to avoid wrinkling. The use of an inner embossing allows items to be loaded easily and adds more resilience.

In some preferred embodiments, paper cushioning alternatives and/or expanded slit sheets are sealed to at least one of the inner or outer layers of indented paper, Kraft/rip proof, standard Kraft, or other non-slit sheet material. The sealing can be at or proximate to the end regions 403 as shown in FIG. 4 or can be at or proximate to side regions 402 as shown in FIG. 4, or to both side and end regions. While the sealing can be to one side region and one end region, preferably, the sealing is to opposing side and/or end regions.

While some of the examples relate to the use of two layers of expanded slit sheets, in some preferred embodiments, a single layer preferably can be used. Further, in some embodiments, even more than two layers of expanded slit sheets can be employed. Thus, at least one layer is employed in the envelope and multiple layers can be employed, as for example, two layers, three layers, four layers, or greater than four layers where enhanced cushioning is desired.

In some preferred embodiments, the latter numbers of layers of expanded slit sheets refer to numbers of layers of expanded paper between the inner most and outer most layers. Accordingly, when the structure as illustrated in embodiments described above are doubled over, the total number of layers of expanded slit sheets in the envelope is doubled while the number of layers of expanded slit sheet layers between the inner most layer and outer most layer is unchanged.

In the most preferred embodiments, the various envelopes of the embodiments of the present invention can be recycled by consumers along with newspapers, magazines, and corrugated containers, etc. There are three categories of paper that can be used as feedstocks for making recycled paper: mill broke, pre-consumer waste, and post-consumer waste. Mill broke is paper trimmings and other paper scrap from the manufacture of paper, and is recycled in a paper mill. Pre-consumer waste is a material which left the paper mill but was discarded before it was ready for consumer use. Post-consumer waste is material discarded after consumer use, such as old corrugated containers (OCC), old magazines, and newspapers. Paper suitable for recycling is called "scrap paper," often used to produce molded pulp packaging.

By way of contrast, air bubble wrapping sheets and Tyvek® envelopes can be recycled, but it should not be added to a consumer's recycling container. Instead, bubble wrap, Tyvek, and plastic bags should be recycled at special collection points. This guidance applies not only to bubble wrap, but also to completely plastic bubble mailers and to air pillows. Air bubble mailers with paper outsides, however, cannot be recycled as-is. If it is feasible to disassemble them into their separate material parts, one could then recycle the paper along with other paper recyclables, and then take the bubble wrap to a drop-off location along with other plastic films. Information about recycling of plastics can be found at "How2Recycle": http://www.how2recycle.info/sdo

ILLUSTRATIVE EXAMPLES OF
EMBODIMENTS OF THE INVENTION

Example A

Envelope for use within a container:
layer 1 is indented;
layer 2 is expanded slit sheet (uniformly opening);
layer 3 is expanded slit sheet, (uniformly opening) crossed-pattern with respect to layer 2;
layer 4 is indented.

Example B

Envelope for use within a container:
layer 1 is Kraft paper;
layer 2 is expanded randomly opening slit sheet;
layer 3 is expanded randomly opening slit sheet;
layer 4 is Kraft paper Example C Mailing envelope for mailing via UPS, FedEx, USPS, etc.:
layer 1 (outer layer) is Kraft/rip proof;
layer 2 is expanded uniformly opening slit sheet;
layer 3 is expanded uniformly opening slit sheet, and crossed-patterned with respect to layer 2;
layer 4 is indented.

Example D

Mailing envelope for mailing via UPS, FedEx, USPS, etc.:
layer 1 (outer layer) is Kraft/rip proof;
layer 2 is expanded randomly opening slit sheet;
layer 3 is expanded randomly opening slit sheet;
layer 4 is indented.

Example E

Mailing envelope for mailing via UPS, FedEx, USPS, etc.:
layer 1 (outer layer) is Indented;
layer 2 is expanded randomly opening slit sheet;
layer 3 is expanded randomly opening slit sheet layer 4 is indented.

Example F

Mailing envelope for mailing via UPS, FedEx, USPS, etc.:
layer 1 (outer layer) is 50 #Kraft;
layer 2 is expanded randomly opening slit sheet;
layer 3 is expanded randomly opening slit sheet layer 4 is a 30 #Kraft.

Example G

Mailing envelope for mailing via UPS, FedEx, USPS, etc.:
layer 1 (outer layer) is Indented;
layer 2 is expanded randomly opening slit sheet;
layer 3 is expanded randomly opening slit sheet;
layer 4 is a 30 #Kraft.

Example H

Mailing envelope for mailing via UPS, FedEx, USPS, etc.;
layer 1 (outer layer) is downward facing indented;
layer 2 is double facing indented.

BROAD SCOPE OF THE INVENTION

The use of individual numerical values is stated as approximations as though the values were preceded by the word "about", "substantially", or "approximately." Similarly, the numerical values in the various ranges specified in this application, unless expressly indicated otherwise, are stated as approximations as though the minimum and maximum values within the stated ranges were both preceded by the word "about", "substantially", or "approximately." In this manner, variations above and below the stated ranges can be used to achieve substantially the same results as values within the ranges. As used herein, the terms "about", "substantially", and "approximately" when referring to a numerical value shall have their plain and ordinary meanings to a person of ordinary skill in the art to which the disclosed subject matter is most closely related or the art relevant to the range or element at issue. The amount of broadening from the strict numerical boundary depends upon many factors. For example, some of the factors which may be considered include the criticality of the element and/or the effect a given amount of variation will have on the performance of the claimed subject matter, as well as other considerations known to those of skill in the art. As used herein, the use of differing amounts of significant digits for different numerical values is not meant to limit how the use of the words "about", "substantially", or "approximately" will serve to broaden a particular numerical value or range. Thus, as a general matter, "about", "substantially", or "approximately" broaden the numerical value. Also, the disclosure of ranges is intended as a continuous range including every value between the minimum and maximum values plus the broadening of the range afforded by the use of the term "about", "substantially", or "approximately". Thus, recitation of ranges of values herein are merely intended to serve as a shorthand method of referring individually to each separate value falling within the range, unless otherwise indicated herein, and each separate value is incorporated into the specification as if it were individually recited herein. To the extent that determining a given amount of variation of some the factors such as the criticality of the slit patterns, paper width differential pre- and post-expansion, paper weights and type, as well as other considerations known to those of skill in the art to which the disclosed subject matter is most closely related or the art relevant to the range or element at issue will have on the performance of the claimed subject matter, is not considered to be within the ability of one of ordinary skill in the art, or is not explicitly stated in the claims, then the terms "about", "substantially", and "approximately" should be understood to mean the numerical value, plus or minus 15%.

It is to be understood that any ranges, ratios and ranges of ratios that can be formed by, or derived from, any of the data disclosed herein represent further embodiments of the present disclosure and are included as part of the disclosure as though they were explicitly set forth. This includes ranges that can be formed that do or do not include a finite upper and/or lower boundary. Accordingly, a person of ordinary skill in the art most closely related to a particular range, ratio or range of ratios will appreciate that such values are unambiguously derivable from the data presented herein.

What is claimed is:

1. A protective product, comprising:
at least one expandable slit paper sheet, said at least on expandable slit paper being expanded between opposing ends of said slit paper sheet to form at least one expanded slit paper sheet;
a first paper sheet facing said at least one expanded slit paper sheet and
a second paper sheet facing an opposite side of said at least one expanded slit paper sheet,
at least one of said first paper sheet and said second paper sheet being fixed to said at least one expanded slit paper sheet at the opposing ends of said at least one expanded slit paper sheet and thereby maintaining said expanded paper in its expanded state,
wherein said at least one expanded slit paper sheet is fixed to at least one of the first paper sheet and the second paper sheet only at two opposite end regions of said at least one expanded slit paper sheet in an expansion direction of said at least one expanded slit paper sheet, and
wherein said first paper sheet and said second paper sheet are free from being fixed to said at least one expanded slit paper sheet across a substantial portion of the area of said at least one expanded slit paper sheet.

2. The protective product according to claim 1, said first paper sheet, said at least one expanded slit paper, and said second paper sheet being folded along a fold line and fixed together forming a pouch region.

3. The protective product according to claim 2, wherein said protective product is an envelope having a flap region that is foldable to enclose said pouch region.

4. The protective product according to claim 3, wherein said first paper sheet and said second paper sheet are closer to one another within said flap region than a width in a thickness direction of said expanded slit sheet paper when said expanded slit sheet paper is in an expanded state.

5. The protective product according to claim 4, wherein at least a central portion of the region of said fold line is free of adhesive.

6. The protective product according to claim 1, wherein said second paper sheet is embossed.

7. The protective product according to claim 6, wherein said second paper sheet has embossments that alternate between being recessed and being raised.

8. The protective product according to claim 1, wherein said first paper sheet has embossings that extend inwardly from a plane of said embossed paper sheet a distance of less than 0.1 inches from a plane of said embossings.

9. The protective product according to claim 1, wherein said slit sheet paper is extensible paper.

10. The protective product according to claim 9, wherein said slit sheet paper is Clupak paper.

11. The protective product according to claim 1, wherein said slit sheet paper is extensible paper having an extensible range measured in a pre-slit configuration, of 5 to 20% in the machine direction.

12. The protective product according to claim 1, wherein said slit sheet paper is extensible paper having an extensible range measured in a pre-slit configuration, of 3 to 20% in the machine direction.

13. The protective product according to claim 1, wherein said slit sheet paper is extensible paper having an extensible range measured in a pre-slit configuration, of 3 to 9% in the machine direction.

14. The extensible slit sheet paper cushioning product of claim 1, wherein the slit sheet paper is a paper having a weight in the range from about 30 to 50 pounds per 3,000 sq. ft.

15. The protective product according to claim 1, wherein:
said first paper sheet contacts but is free from connection to said at least one expanded slit paper sheet at sides of said first paper sheet.

16. The protective product according to claim 1, wherein:
said protective product is a recyclable paper product.

17. The protective product according to claim 1, wherein:
said protective product is an envelope having a pouch including said first paper sheet and said at least one expanded slit paper together folded to form front and back walls of said pouch, wherein said first paper sheet contacts but is free from connection to said expanded slit paper sheet at sides of said pouch, and
said first paper sheet is fixed to said at least one expanded slit paper sheet at peripheral ends of said at least one expanded slit paper sheet and thereby maintaining said at least one expanded paper in its expanded state.

18. The protective product according to claim 1, wherein:
said at least one expanded slit paper sheet in an expanded state includes a plurality of expanded slit paper sheets in an expanded state layered alongside each other.

19. The protective product according to claim 18, wherein:
said plurality of expanded slit papers sheets includes two expanded slit paper sheets.

20. An envelope, comprising:
at least one expanded slit paper sheet in an expanded state;
a first paper sheet facing a first face of said at least one expanded slit paper sheet and fixed in relation to said at least one expanded slit paper sheet along two opposite peripheral ends of said at least one expanded slit paper sheet;
a second paper sheet facing said at least one expanded slit paper sheet on an opposite face of said at least one expanded slit paper sheet from said first paper sheet and fixed in relation to said at least one expanded slit paper sheet along two opposite peripheral ends of said at least one expanded slit paper;
wherein said at least one expanded slit paper sheet is at least one substantially rectangular sheet that is fixed to at least one of the first paper sheet and the second paper sheet only at two opposite end regions of said at least one expanded slit paper sheet in an expansion direction of said at least one expanded slit paper sheet; and
said first paper sheet and said second paper sheet contact said at least one expanded slit paper sheet across a substantial portion of the area of said at least one expanded slit paper sheet but are free from connection to said at least one expanded slit paper sheet across said substantial portion of the area of said at least one expanded slit paper sheet.

21. The envelope according to claim 20, wherein one of said first paper sheet and said second paper sheet is a non-embossed Kraft sheet having a weight of 40 #paper or more under the TAPPI standard paper weight specification for 3000 square feet.

22. The envelope according to claim 20, wherein one of said first paper sheet and said second paper sheet is a non-embossed Kraft sheet having a weight of 50 #paper or more under the TAPPI standard paper weight specification for 3000 square feet.

23. The envelope according to claim 20, wherein said envelope has a pouch including a cushioning walls, with the second paper sheet being an interior layer forming an interior wall of the pouch, the first paper sheet being an exterior layer forming an exterior wall of the pouch, and the at least one expanded slit paper sheets being between the interior layer and the exterior layer.

24. The envelope according to claim 23, wherein said cushioning wall of said pouch is folded along a fold line such that the cushioning wall forms both front and back walls of said pouch and such that said first paper sheet is an exterior layer on both front and back faces of the front and back walls of said pouch.

25. The envelope according to claim 24, wherein the back wall of said pouch is longer than the front wall of said pouch, and wherein a portion of said first paper sheet that extends beyond an end of the front wall has an adhesive strip fixed thereto with a removable release liner for adhesively closing said envelope by removing the release liner and adhering said adhesive strip to the front wall.

26. The envelope according to claim 24, wherein the back wall of said pouch is longer than the front wall of said pouch and forms a flap region, and wherein a portion of said first paper sheet and said second paper sheet within said flap region are closer to one another than a width in a thickness direction of said expanded slit sheet paper when said expanded slit sheet paper is in an expanded state.

27. The envelope according to claim 20, wherein said envelope has a pouch including a cushioning wall, wherein said cushioning wall has four layers, with the first paper sheet forming a first of the four layers and being an exterior layer forming exterior walls of the pouch, the two expanded slit paper sheets forming second and third layers of the four layers in between the first and fourth layers and with the second and third layers in direct contact with each other, and the second paper sheet forming the fourth of the four layers and being an interior layer forming interior walls of the pouch.

28. A method, comprising:
providing the envelope of claim 20; and
placing an item within a pouch of said envelope with said at least one expanded slit paper sheet providing cushioning to protect said item within said pouch.

29. A method of making an envelope according to claim 20, including fixing opposite ends of said at least one expanded slit paper sheet in an expansion direction of the at least one expanded slit paper sheet.

30. The envelope according to claim 20, wherein the slit sheet paper is a paper having a weight in the range from about 30 to 50 pounds per 3,000 sq. ft.

31. The envelope according to claim 20, wherein said first paper sheet and said second paper sheet are non-embossed sheets.

* * * * *